US011234031B1

(12) United States Patent
Pappu et al.

(10) Patent No.: US 11,234,031 B1
(45) Date of Patent: Jan. 25, 2022

(54) SYSTEMS AND METHODS FOR SKIP-BASED CONTENT DETECTION

(71) Applicant: Spotify AB, Stockholm (SE)

(72) Inventors: Aasish Kumar Pappu, Jersey City, NJ (US); Rosemary Ellen Jones, Cambridge, MA (US); Sari Nahmad, Brooklyn, NY (US); Kristin Savage, Brooklyn, NY (US); Aswin Sivaraman, Bolingbrook, IL (US)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 17/076,457

(22) Filed: Oct. 21, 2020

(51) Int. Cl.
*H04N 21/24* (2011.01)
*H04N 21/25* (2011.01)
*H04N 21/234* (2011.01)

(52) U.S. Cl.
CPC ....... *H04N 21/2407* (2013.01); *H04N 21/234* (2013.01); *H04N 21/251* (2013.01)

(58) Field of Classification Search
None
See application file for complete search history.

(56) References Cited

U.S. PATENT DOCUMENTS

2017/0155959 A1 6/2017 Vinson et al.
2018/0160196 A1 6/2018 Wahl et al.

OTHER PUBLICATIONS

Clifford Chi, YouTube Analytics: The 15 Metrics That Actually Matter, HubSpot, Marketing/8 Min Read, Copyright 2018 HubSpot, Inc., 14 pgs.

*Primary Examiner* — Justin E Shepard
(74) *Attorney, Agent, or Firm* — Morgan, Lewis & Bockius LLP

(57) ABSTRACT

An electronic device associated with a media-providing service obtains listening history for a media item. The listening history includes retention information that indicates a number of listeners who listened to the respective portion of the media item. Using the retention information, the electronic device generates a retention graph that represents the number of listeners who listened to corresponding portions of the media item as a function of time. The electronic device detects an extremum in the retention graph. The extremum corresponds to a reduction in the number of listeners who listened to the corresponding portions of the media item. The electronic device determines whether the extremum meets predefined criteria, and in accordance with the determination that the extremum meets the predefined criteria, the electronic device stores an indication that the portions of the media item corresponding to the extremum include sub-content embedded in the media item.

19 Claims, 24 Drawing Sheets

800

802 At an electronic device that is associated with a media-providing service:

810 Obtain a listening history for a media item. The listening history includes retention information indicating, for each respective portion of a plurality of portions of the media item, a number of listeners who listened to the respective portion of the media item.

812 The retention information includes a subset, less than all, of listeners who interacted with the media item and meet predefined listener criteria.

814 The retention information is generated at a server system that is distinct and remote from a user device configured to present the media content to a listener.

816 The media item does not include a video.

820 Using the retention information, generate a retention graph representing the number of listeners who listened to corresponding portions of the media item as a function of time.

824 Generating the retention graph includes aggregating the retention information; and smoothing, inverting, and normalizing the retention graph.

SYSTEMS AND METHODS FOR SKIP-BASED CONTENT DETECTION

TECHNICAL FIELD

The disclosed embodiments relate generally to content detection, and, in particular, to using listener retention information to detect sub-content in media content that include audio.

BACKGROUND

Access to electronic media, such as music and video content, has expanded dramatically over time. As a departure from physical media, media content providers stream media to electronic devices across wireless networks, improving the convenience with which users can digest and experience such content.

As more people access media content items using media content providers, there is an opportunity to monetize media content items, such as by providing advertising information in conjunction with provision of the media content item or by providing premium access that allows users to bypass advertising segments in media content items.

SUMMARY

There is a need for systems and methods for accurately determining whether advertisement are present in media content items (e.g., podcasts) and, if so, at what point in the media content item the advertisements have been embedded. This technical problem is complicated by the different ways in which a media content item may include one or more advertisements. For example, an advertisement may be added in post-production and include markers indicating the start and end of an advertisement. In another example, an advertisement may be embedded in the media content item where markers for the advertisement(s) do not exist. The embedded advertisements may also be read by a host or presenter of the media content item. Further, some media content items include interludes that are part of the main content, such as musical interludes or inserted audio clips (such as from a caller or an audio clip from a movie or TV show).

Some embodiments described herein offer a technical solution to these problems by determining the presence of media content items using retention information obtained from user listening histories. To do so, the systems and methods described herein generate a retention graph that indicates the number of listeners who played a corresponding portion of the media item as a function of time. Since listeners often skip portions of the media content item that contain advertisements, analysis of user retention information for a media content item may be useful in identifying the presence and/or location of advertisements in the media content item. By determining dips in the retention graph (which correspond to fewer listeners) and comparing characteristics of the dips to predefined criteria, locations of advertisements in media content items can be accurately identified.

To that end, in accordance with some embodiments, a method is performed at an electronic device that is associated with a media-providing service. The electronic device has one or more processors and memory storing instructions for execution by the one or more processors. The method includes obtaining a listening history for a media item. The listening history includes retention information that indicates, for each respective portion of a plurality of portions of the media item, a number of listeners who listened to the respective portion of the media item. The method also includes generating a retention graph from the retention information. The retention graph represents the number of listeners who listened to corresponding portions of the media item as a function of time. The method further includes detecting one or more extrema in the retention graph. Each extremum of the one or more extrema in the retention graph corresponds to a reduction in the number of listeners who listened to the corresponding portions of the media item. The method also includes determining that a first extremum of the one or more extrema meets predefined sub-content criteria and in accordance with the determination that the first extremum meets the predefined sub-content criteria, storing an indication that the portions of the media item corresponding to the first extremum comprise first sub-content, different from primary content, that is embedded in the media item.

In accordance with some embodiments, a computer system that is associated with a media-providing service includes one or more processors and memory storing one or more programs configured to be executed by the one or more processors. The one or more programs include instructions for obtaining a listening history for a media item. The listening history includes retention information that indicates, for each respective portion of a plurality of portions of the media item, a number of listeners who listened to the respective portion of the media item. The one or more programs also include instructions for generating a retention graph from the retention information. The retention graph represents the number of listeners who listened to corresponding portions of the media item as a function of time. The one or more programs further include instructions for detecting one or more extrema in the retention graph. Each extremum of the one or more extrema in the retention graph corresponds to a reduction in the number of listeners who listened to the corresponding portions of the media item. The one or more programs also include instructions for determining that a first extremum of the one or more extrema meets predefined sub-content criteria and in accordance with the determination that the first extremum meets the predefined sub-content criteria, storing an indication that the portions of the media item corresponding to the first extremum comprise first sub-content, different from primary content, that is embedded in the media item.

In accordance with some embodiments, a computer-readable storage medium has stored therein instructions that, when executed by a server system that is associated with a media-providing service, cause the server system to obtaining a listening history for a media item. The listening history includes retention information that indicates, for each respective portion of a plurality of portions of the media item, a number of listeners who listened to the respective portion of the media item. The instructions also cause the server system to generate a retention graph from the retention information. The retention graph represents the number of listeners who listened to corresponding portions of the media item as a function of time. The instructions further cause the server system to detect one or more extrema in the retention graph. Each extremum of the one or more extrema in the retention graph corresponds to a reduction in the number of listeners who listened to the corresponding portions of the media item. The instructions further cause the server system to determine that a first extremum of the one or more extrema meets predefined sub-content criteria and in accordance with the determination that the first extremum meets the predefined sub-content criteria, store an indication that the portions of the media item corresponding to the first extremum comprise first sub-content, different from primary content, that is embedded in the media item.

Thus, systems are provided with improved methods for identifying the presence and/or locations of advertisements in media content items that are provided by a media-providing service.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 8A-8G are flow diagrams illustrating a method of identifying the presence of sub-content in a media content item, in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first set of parameters could be termed a second set of parameters, and, similarly, a second set of parameters could be termed a first set of parameters, without departing from the scope of the various described embodiments. The first set of parameters and the second set of parameters are both sets of parameters, but they are not the same set of parameters.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1A:
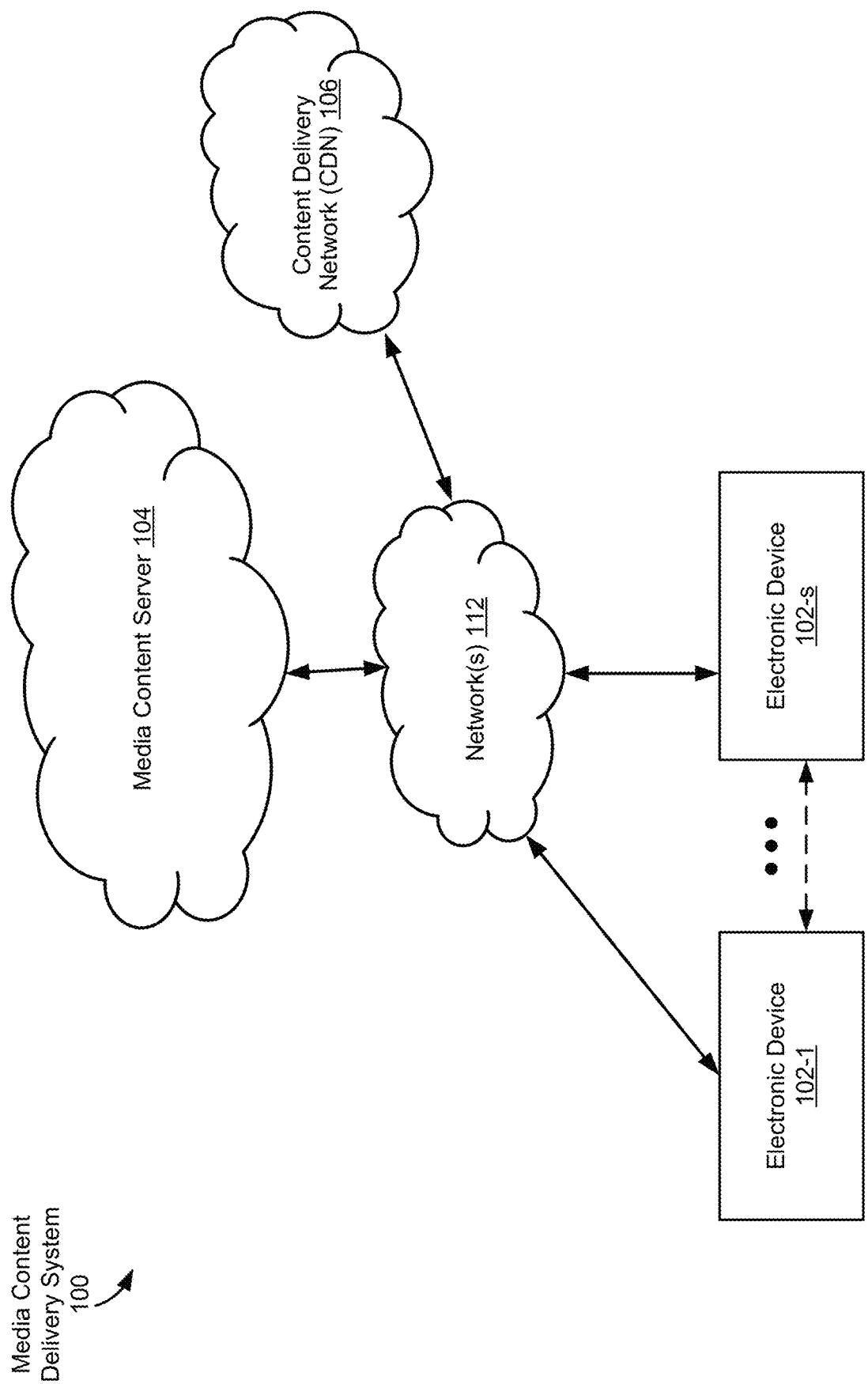
FIG. 1A is a block diagram illustrating a media content delivery system, in accordance with some embodiments.

FIG. 1A is a block diagram illustrating a media content delivery system, in accordance with some embodiments. The media content delivery system 100 includes one or more electronic devices 102 (e.g., electronic device 102-1 to electronic device 102-s, where s is an integer greater than one), one or more media content servers 104, and/or one or more content delivery networks (CDNs) 106. The one or more media content servers 104 are associated with (e.g., at least partially compose) a media-providing service. The one or more CDNs 106 store and/or provide one or more content items (e.g., to electronic devices 102). In some embodiments, the one or more CDNs 106 are associated with the media-providing service. In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, digital media player, a speaker, television (TV), digital versatile disk (DVD) player, and/or any other electronic device capable of presenting media content (e.g., controlling playback of media items, such as music tracks, videos, etc.). Electronic devices 102 may connect to each other wirelessly and/or through a wired connection (e.g., directly through an interface, such as an HDMI interface). In some embodiments, an electronic device 102 is a headless client. In some embodiments, electronic devices 102-1 and 102-s are the same type of device (e.g., electronic device 102-1 and electronic device 102-s are both speakers). Alternatively, electronic device 102-1 and electronic device 102-s include two or more different types of devices.

In some embodiments, electronic devices 102-1 and 102-s send and receive media-control information through network(s) 112. For example, electronic devices 102-1 and 102-s send media control requests (e.g., requests to play music, movies, videos, or other media items, or playlists thereof) to media content server 104 through network(s) 112. Additionally, electronic devices 102-1 and 102-s, in some embodiments, also send indications of media content items to media content server 104 through network(s) 112. In some embodiments, the media content items are uploaded to electronic devices 102-1 and 102-s before the electronic devices forward the media content items to media content server 104.

In some embodiments, electronic device 102-1 communicates directly with electronic device 102-s (e.g., as illustrated by the dotted-line arrow), or any other electronic device 102. As illustrated in FIG. 1A, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-s. In some embodiments, electronic device 102-1 communicates with electronic device 102-s through network(s) 112. In some embodiments, electronic device 102-1 uses the direct connection with electronic device 102-s to stream content (e.g., data for media items) for playback on the electronic device 102-s.

In some embodiments, electronic device 102-1 and/or electronic device 102-s include a media application 222 (FIG. 2) that allows a respective user of the respective electronic device to upload (e.g., to media content server 104), browse, request (e.g., for playback at the electronic device 102), and/or present media content (e.g., control playback of music tracks, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). In some embodiments, the electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, and/or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 provides media content items to electronic devices 102-s (e.g., users) of the media-providing service. In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 1B:
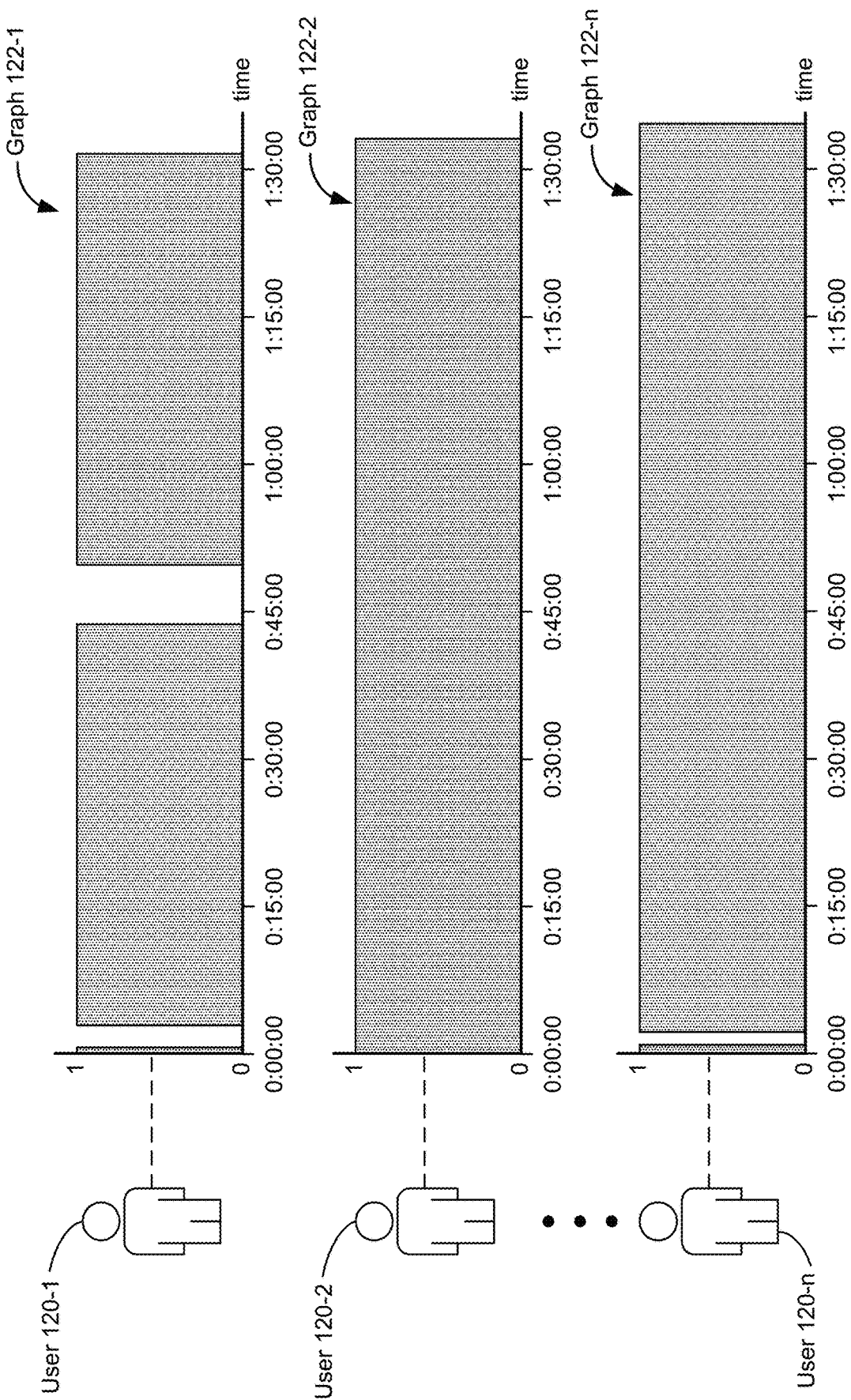
FIG. 1B illustrates listener retention information of media content items in a media content delivery system, in accordance with some embodiments.

FIG. 1B illustrates listener retention information of media content items in a media content delivery system in accordance with some embodiments. Media content delivery system 100 is configured to provide, via a media-providing service, media content items to users 120-n of the media-providing service. Each media content item includes main content. In some embodiments, at least some of the media content items include sub-content that is distinct from the main content. For example, a media content item that is a podcast may include main content, such as the main podcast episode, as well as sub-content, such as one or more advertisements. FIG. 1B illustrates the listener retention information of three different users 120-1, 120-2, and 120-n for a same media content item. In this example, all three users 120-1, 120-2, and 120-n have listened to a same media content item and graphs 122-1, 122-2, and 122-n represent portions of the media content item that each listener played, respectively. In FIG. 1B, a value of 1 along the vertical axis indicates that the user's device played back the portion of the media item and a value of 0 indicates that the user's device did not play back the portion of the media item, e.g., because the user skipped that portion. For example, graph 122-1 shows that user 120-1 skipped the first few minutes of the media content item and skipped a portion of the media content item from roughly 44 minutes to 48 minutes, graph 122-2 shows that user 120-1 listened to the entire media content item (e.g., did not skip any portions of the media content item), and graph 122-n shows that user 120-n skipped a first portion of the media content item between 30 seconds and 1 minute.

Figure 1C:
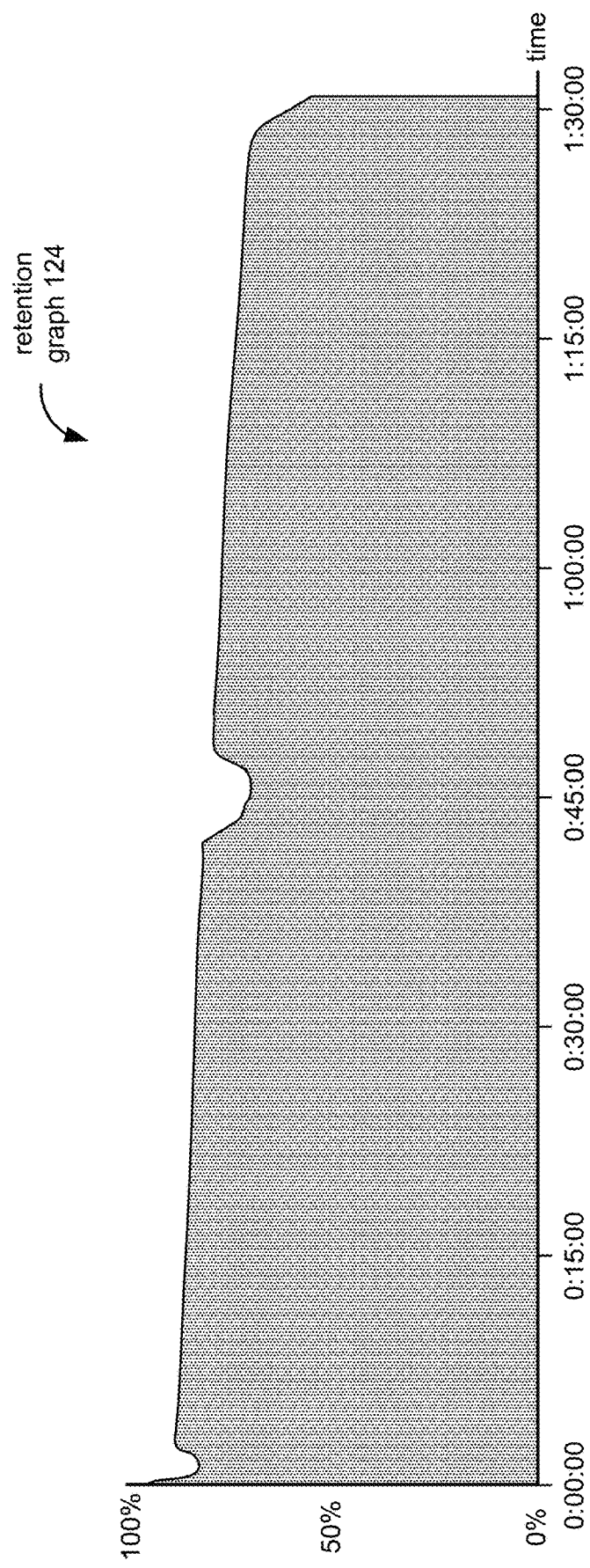
FIG. 1C shows a retention graph for a media content item generated from listener retention information from a plurality of users that listened to the media content item.

FIG. 1C shows a retention graph 124 for a media content item generated from listener retention information from a plurality of users that listened to the media content item. For example, retention graph 124 is generated based on the listener retention information represented by graphs 122-1 to 122-n (shown in FIG. 1B). The retention graph 124 represents the number (e.g., expressed as a fraction or percentage) of listeners who listened to corresponding portions of the media item as a function of time. In this example, retention graph 124 shows that there are dips in the number of listeners at the beginning of the media content item (e.g., near the 1 minute mark) and in the middle of the media content item (e.g., near the 45 minute mark), and a drop off in the number of listeners towards the end of the media content item play time (e.g., near starting right before the 1 hour 30 minute mark).

Since users tend to listen to media content items for the main content and tend to skip or fast forward over sub-content in the media content item, a retention graph (like retention graph 124) can be used to determine if a media content item includes sub-content and to determine the position within the media content item that the sub-content is located. By analyzing a retention graph, to look for dips in listener retention that meet predefined criteria, the existence and location of sub-content item(s) in a media content item can be identified.

Figure 2:
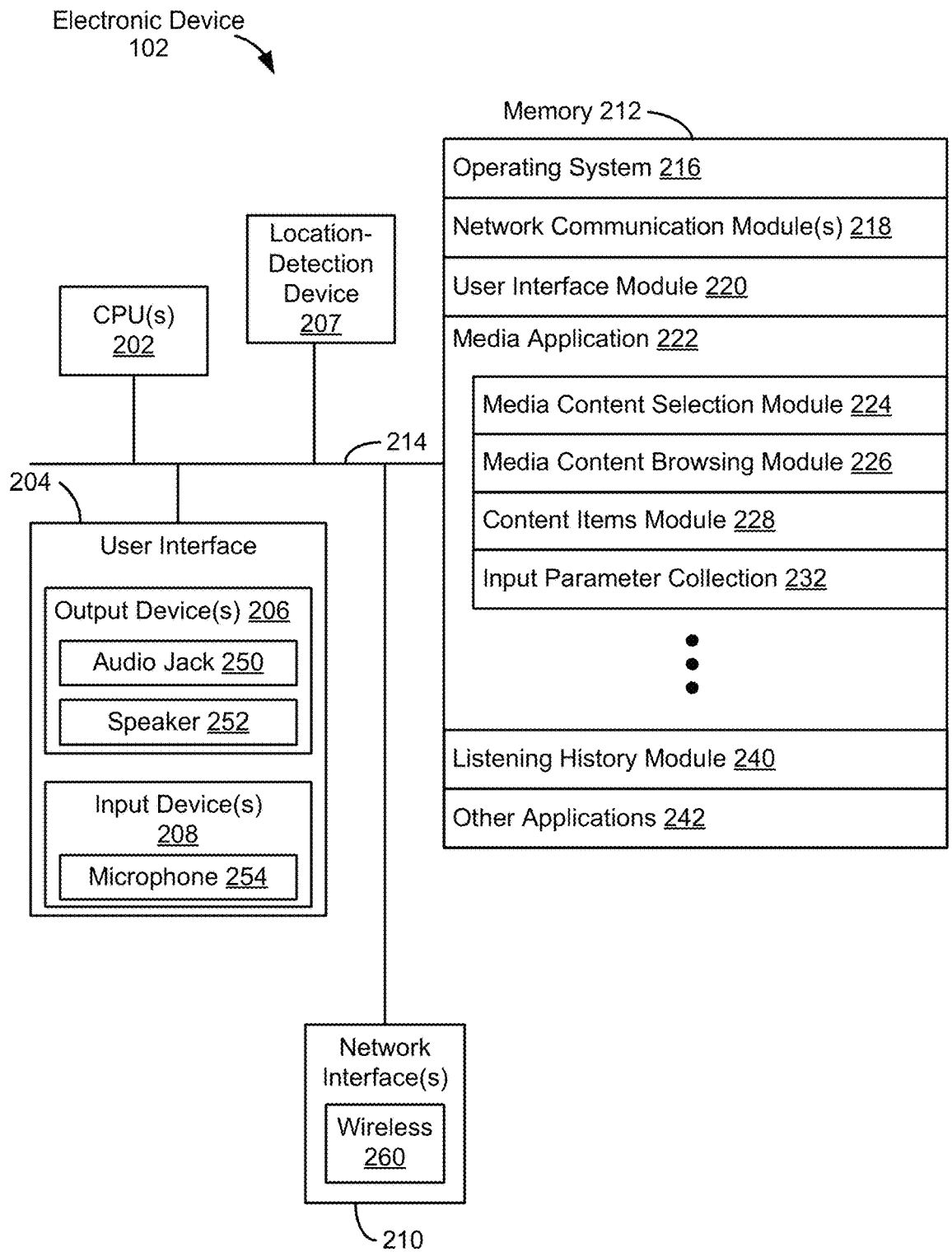
FIG. 2 is a block diagram illustrating a client device, in accordance with some embodiments.

FIG. 2 is a block diagram illustrating an electronic device 102 (e.g., electronic device 102-1 and/or electronic device 102-s, FIG. 1A), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include an audio jack 250 (or other physical output connection port) for connecting to speakers, earphones, headphones, or other external listening devices and/or speaker 252 (e.g., speakerphone device). Furthermore, some electronic devices 102 use a microphone and voice recognition device to supplement or replace the keyboard. Optionally, the electronic device 102 includes an audio input device (e.g., a microphone 254) to capture audio (e.g., speech from a user).

Optionally, the electronic device 102 includes a location-detection device 207, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, and/or other wireless (e.g., Bluetooth-compatible) devices (e.g., for streaming audio data to the electronic device 102 of an automobile). Furthermore, in some embodiments, the wireless interface 260 (or a different communications interface of the one or more network interfaces 210) enables data communications with other WLAN-compatible devices (e.g., electronic device(s) 102) and/or the media content server 104 (via the one or more network(s) 112, FIG. 1A).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

- an operating system 216 that includes procedures for handling various basic system services and for performing hardware-dependent tasks;
- network communication module(s) 218 for connecting the electronic device 102 to other computing devices (e.g., other electronic device(s) 102, and/or media content server 104) via the one or more network interface(s) 210 (wired or wireless) connected to one or more network(s) 112;
- a user interface module 220 that receives commands and/or inputs from a user via the user interface 204 (e.g., from the input devices 208) and provides outputs for playback and/or display on the user interface 204 (e.g., the output devices 206);
- a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:

- media content selection module 224 for selecting one or more media content items and/or sending, to the media content server, an indication of the selected media content item(s);
- media content browsing module 226 for providing controls and/or user interfaces enabling a user to navigate, select for playback, and otherwise control or interact with media content, whether the media content is stored or played locally or remotely;
- content items module 228 for storing media items for playback at the electronic device;
- an input parameter collection module 232 for collecting, storing and/or creating (e.g., curating) input parameter collections indicating a current context of the user (e.g., time of day, location, device);
- a listening history module 240 (sometimes referred to as a playback history module) for storing (e.g., as a list for each user) media content items that have been presented (e.g., streamed, provided, downloaded, played) to a respective user and/or analyzing playback patterns for one or more users. For example, listening history module 240 may store listener retention information indicating which portions of a media content item a listener played or skipped;
- other applications 242, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
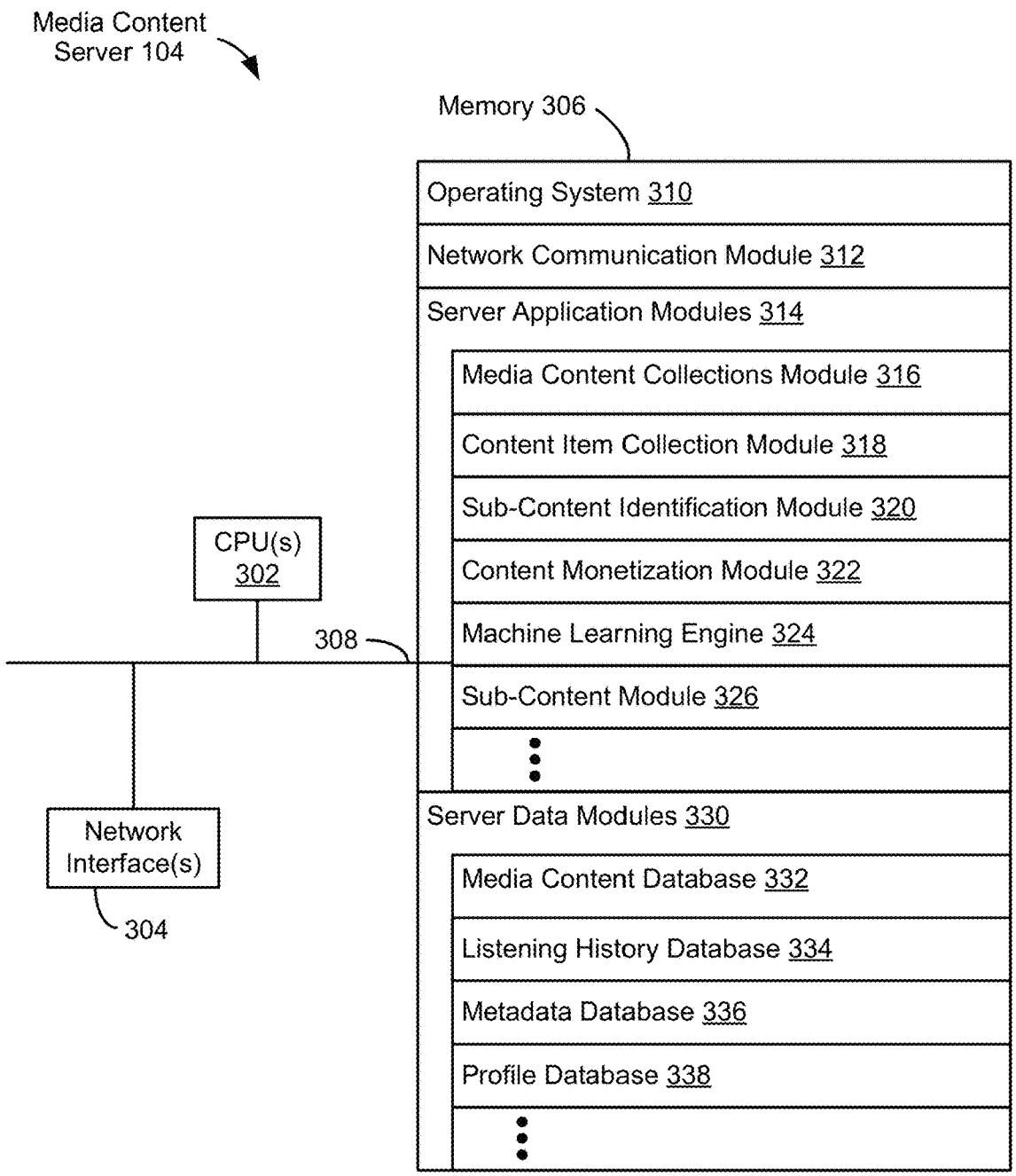
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

- an operating system 310 that includes procedures for handling various basic system services and for performing hardware-dependent tasks;
- a network communication module 312 that is used for connecting the media content server 104 to other computing devices via one or more network interfaces 304 (wired or wireless) connected to one or more networks 112;
- one or more server application modules 314 for performing various functions with respect to providing and managing a content service, the server application modules 314 including, but not limited to, one or more of:
  - a media content collections module 316 for storing and/or creating (e.g., curating) media content collections, each media content collection associated with one or more descriptor terms (e.g., playlist titles and/or descriptions) and/or including one or more media content items;
  - a content item collection module 318 for collecting and storing media items for playback;
  - a sub-content identification module 320 for identifying the presence of and/or storing indications of sub-content(s) in media content items of the media-providing service;
  - a content monetization module 322 for identifying and/or storing monetization status of media content items;
  - a machine learning engine 324 (e.g., machine learning model) trained to associate a media content item identifier with expected sub-content start time(s), end time(s), and/or duration(s);
  - a sub-content module 326 for replacing existing sub-content in a media content item with new sub-content;
- one or more server data module(s) 330 for handling the storage of and/or access to media items and/or metadata relating to the media items; in some embodiments, the one or more server data module(s) 330 include:
  - a media content database 332 for storing media content items;
  - a listening history database 334 (also referred to as a playback history database) for storing (e.g., as a list for each user) media content items that have been consumed (e.g., streamed, listened, viewed) by a respective user as well as storing listener retention information for media content items played by a respective user;
  - a metadata database 336 for storing metadata relating to the media items; and
  - a profile database 338 for storing user profiles (e.g., user information) of users of the media-providing service.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above. In some embodiments, memory 212 stores one or more of the above identified modules described with regard to memory 306. In some embodiments, memory 306 stores one or more of the above identified modules described with regard to memory 212.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 336 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

Figure 4A:
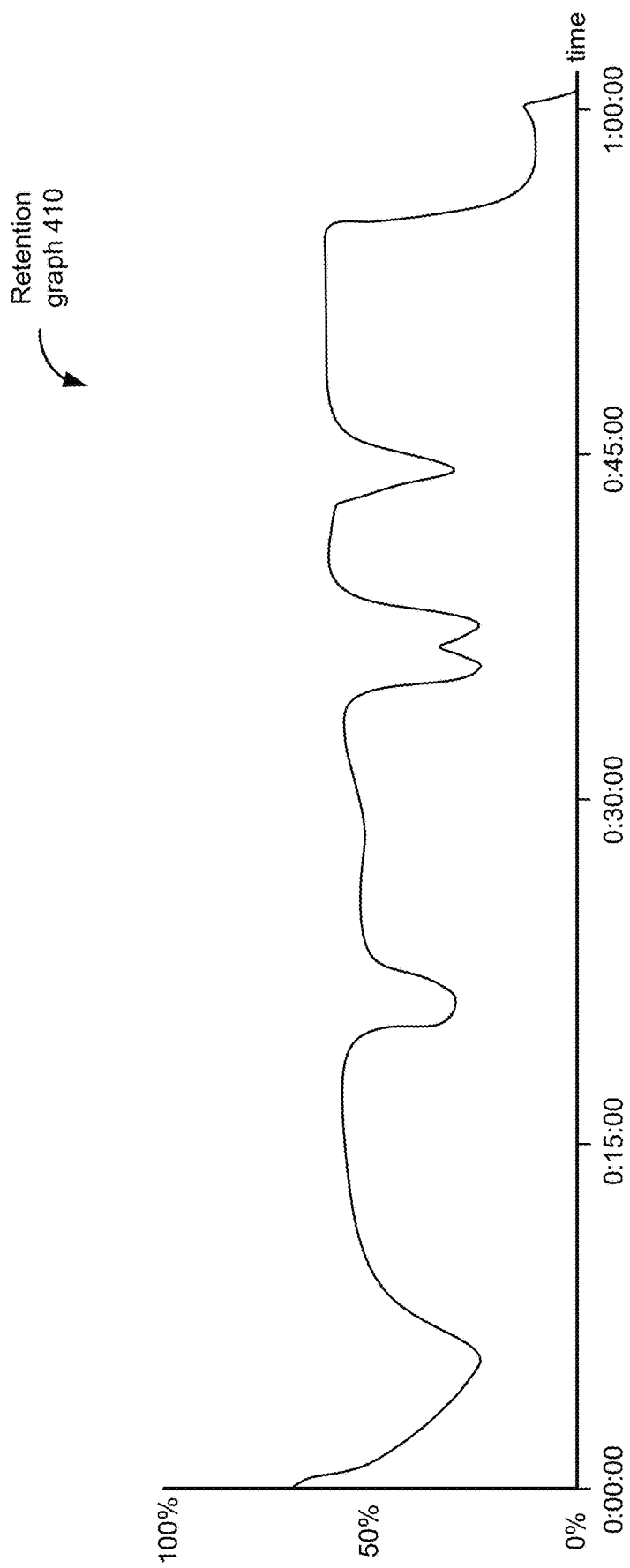
FIG. 4A illustrates a retention graph of a media content item, in accordance with some embodiments.
Figure 4B:
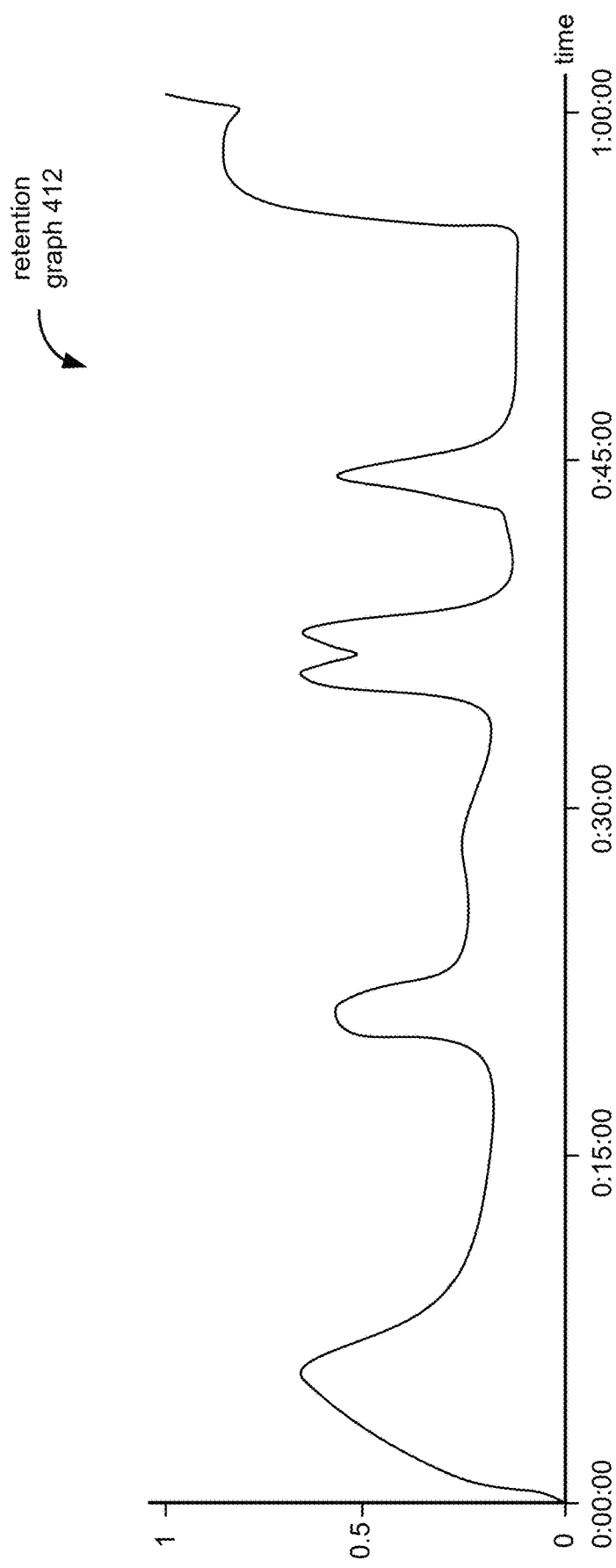
FIG. 4B shows a normalized and inverted retention graph, corresponding to the retention graph of FIG. 4A, in accordance with some embodiments.
Figure 4C:
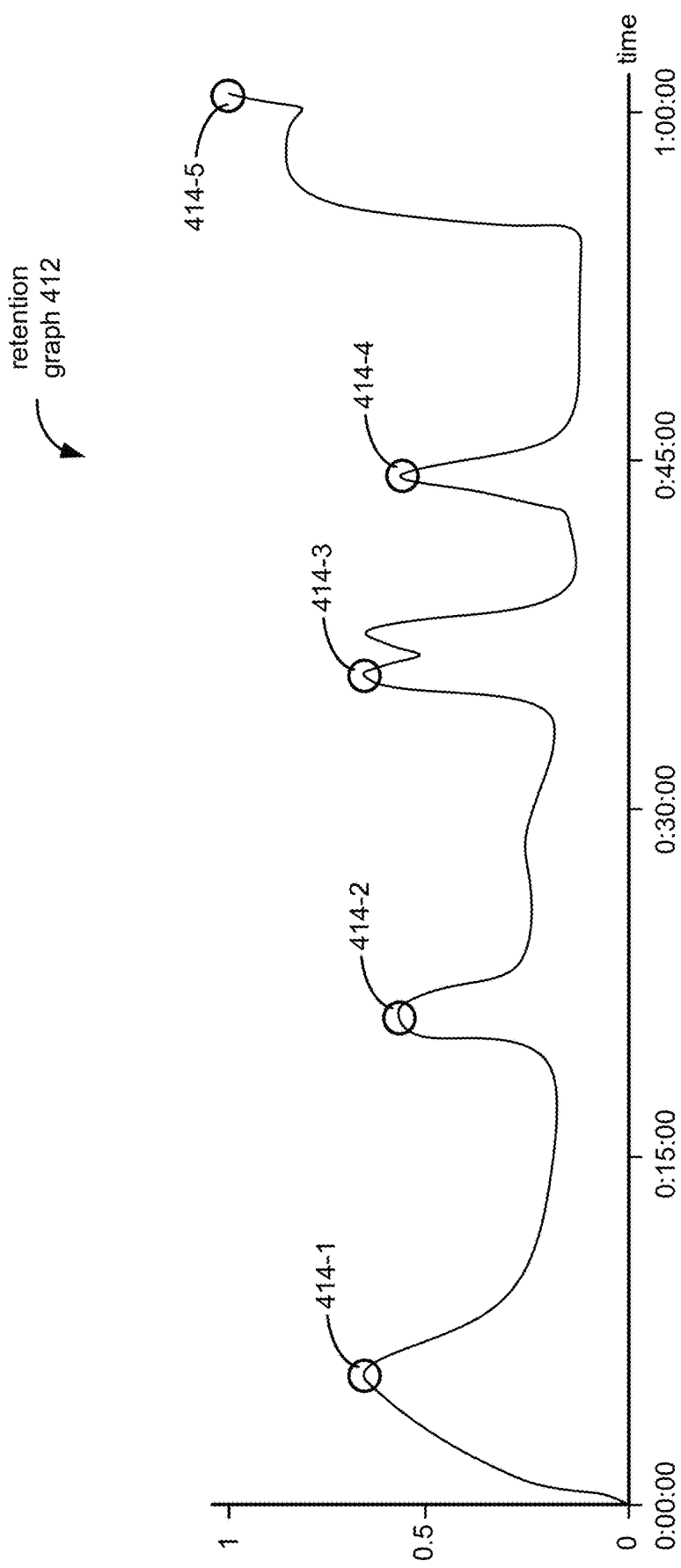
FIG. 4C illustrate using a retention graph for identifying portions of a media content item that may correspond to sub-content, in accordance with some embodiments.

FIGS. 4A-4C illustrate using a retention graph for identifying portions of a media content item that may correspond to sub-content, in accordance with some embodiments.

FIG. 4A illustrates a retention graph 410 of a media content item in accordance with some embodiments. The retention graph 410 is an time series that represents the number of listeners (e.g., expressed as a fraction or percentage) who listened to corresponding portions of the media content item as a function of time. The retention graph is generated (e.g., by sub-content identification module 320) from listener retention information for a plurality of users that played or listened to the media content item. In some embodiments, the retention graph 410 is generated by aggregating listener retention information for a plurality of users that played or listened to the media content item. In some embodiments, the retention graph 410 is generated based on listener retention information for all users that played or listened to at least a predetermined portion of the media content item (e.g., at least one hour, at least 50% of the total play time of the media content item). In some embodiments, the retention graph 410 is generated based on listener retention information for a subset of users, less than all, that played the media content item (e.g., only those users that listened to at least one hour, at least 50% of the total play time of the media content item). In some embodiments, the subset of users include users that have a profile associated with the media providing service. In some embodiments, the subset of users includes users that listened to or played the entire duration (e.g., play time) of the media content item. In some embodiments, listener retention information of a media content item for a first user may include more than one entry. For example, the first user may, at a first time, play the entire media content item and at a second time, play a portion, less than all of the media content item. In this example, the first user may have fallen asleep while listening to the media content item when playing it at a first time, and may replay portions of the media content item at the second time in order to finish listening to the media content item. In such cases, it may be possible for listener retention information to be logged for both listening sessions (e.g., a first entry for the first time the first user played the media content item and a second entry, separate from the first entry, for the second time the first user played the media content item).

FIG. 4B shows a normalized and inverted retention graph 412, corresponding to retention graph 410. Sub-content identification module 320 generates retention graph 412 by inverting retention graph 410 so that dips in retention graph 410 are shown as peaks in retention graph 412, and normalizing the inverted retention graph so that the maximum value of the inverted retention graph corresponds to 1.

Referring to FIG. 4C, after generating retention graph 412, the sub-content identification module 320 identifies one or more extrema (e.g., peaks) in retention graph 412. In some embodiments, the sub-content identification module 320 identifies one or more extrema 414 (e.g., peaks) in retention graph 412 by applying a peak detection algorithm (e.g., any of the peak detection algorithms described herein). Circles indicate detected extrema 414-1 to 414-5 in retention graph 412.

FIGS. 5A-5D and 6A-6C illustrate two methods of identifying start and end times of an extremum (e.g., peak) in the retention graph 412. By associating identified extrema with a respective start and end time, an estimated duration of the extremum can be used as a criterion for determining whether or not the extremum 414 in the retention graph 412 is likely to correspond to sub-content. The method illustrated in FIGS. 5A-5D uses secants to identify start and end times corresponding to an extremum in the retention graph, and the method illustrated in FIGS. 6A-6C uses a second derivative of the retention graph to identify start and end times corresponding to an extremum in the retention graph.

Figure 5A:
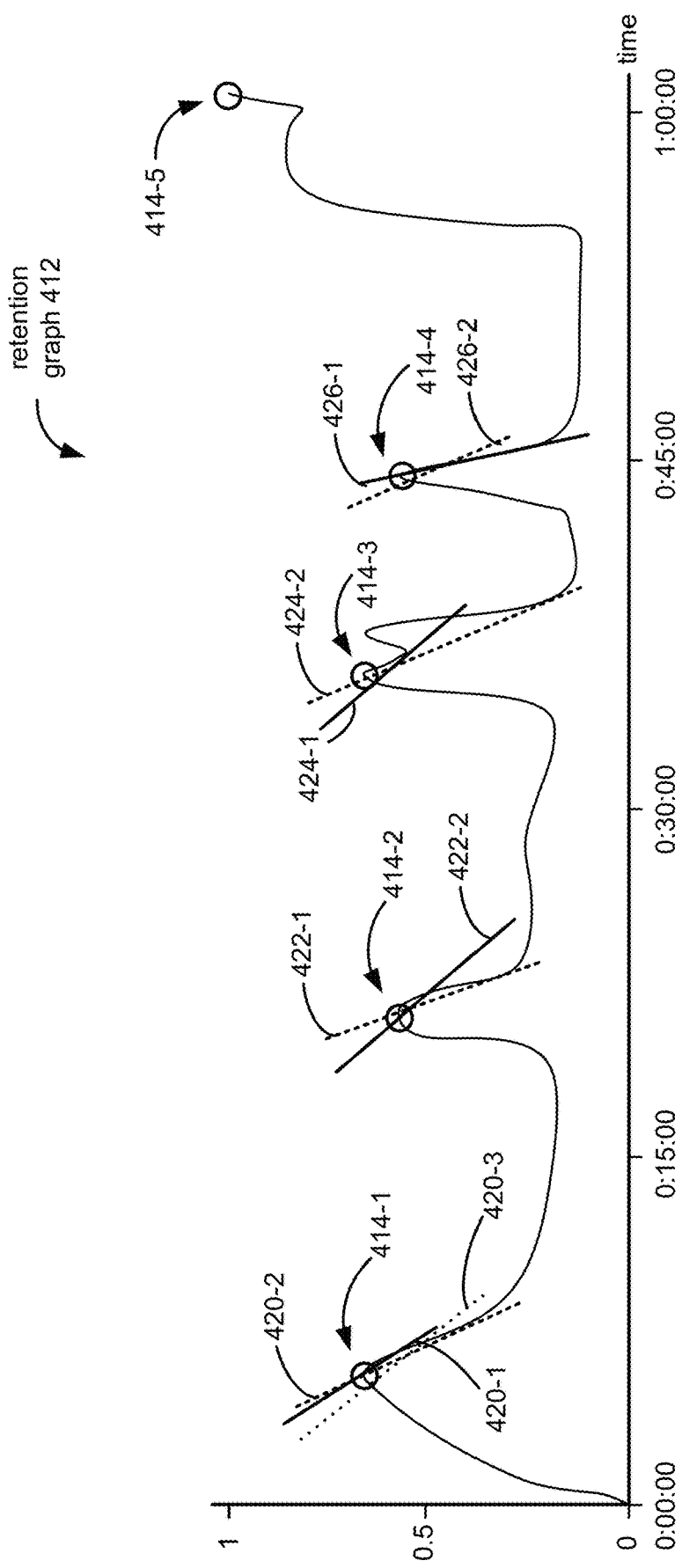
FIGS. 5A-5D illustrate analysis of an inverted retention graph using secants, in accordance with some embodiments.

FIG. 5A illustrates that, for an identified extremum 414 of the retention graph 412, the sub-content identification module 320 calculates one or more secants that each intersect with retention graph 412 at two points. A first intersecting point of a secant and the retention graph 412 corresponds to a location of the identified extremum 414, and a second intersecting point of the secant and retention graph 412 corresponds to a location of a possible end time corresponding to the extremum. FIG. 5A provides an example where three secants (e.g., secants 420-1, 420-2, and 420-3) intersecting extremum 414-1 are calculated, two secants (e.g., secants 422-1 and 422-2) intersecting extremum 414-2 are calculated, two secants (e.g., secants 424-1 and 424-2) intersecting extremum 414-3 are calculated, two secants (e.g., secants 426-1 and 426-2) intersecting extremum 414-4 are calculated, and no secants are calculated for extremum 414-5. In some embodiments, the sub-content identification module 320 calculates a secant for each identified extremum in retention graph 412. In some embodiments, the sub-content identification module 320 calculates a secant for a subset, less than all, of the identified extrema. In some embodiments, for an identified extremum 414 of the retention graph 412, the sub-content identification module 320 calculates a secant for each point that is within a predetermined time frame (e.g., +/−90 seconds, +/−60 seconds, +/−30 seconds) of the extremum 414 (e.g., extremum location, extremum position, extremum time stamp).

Figure 5B:
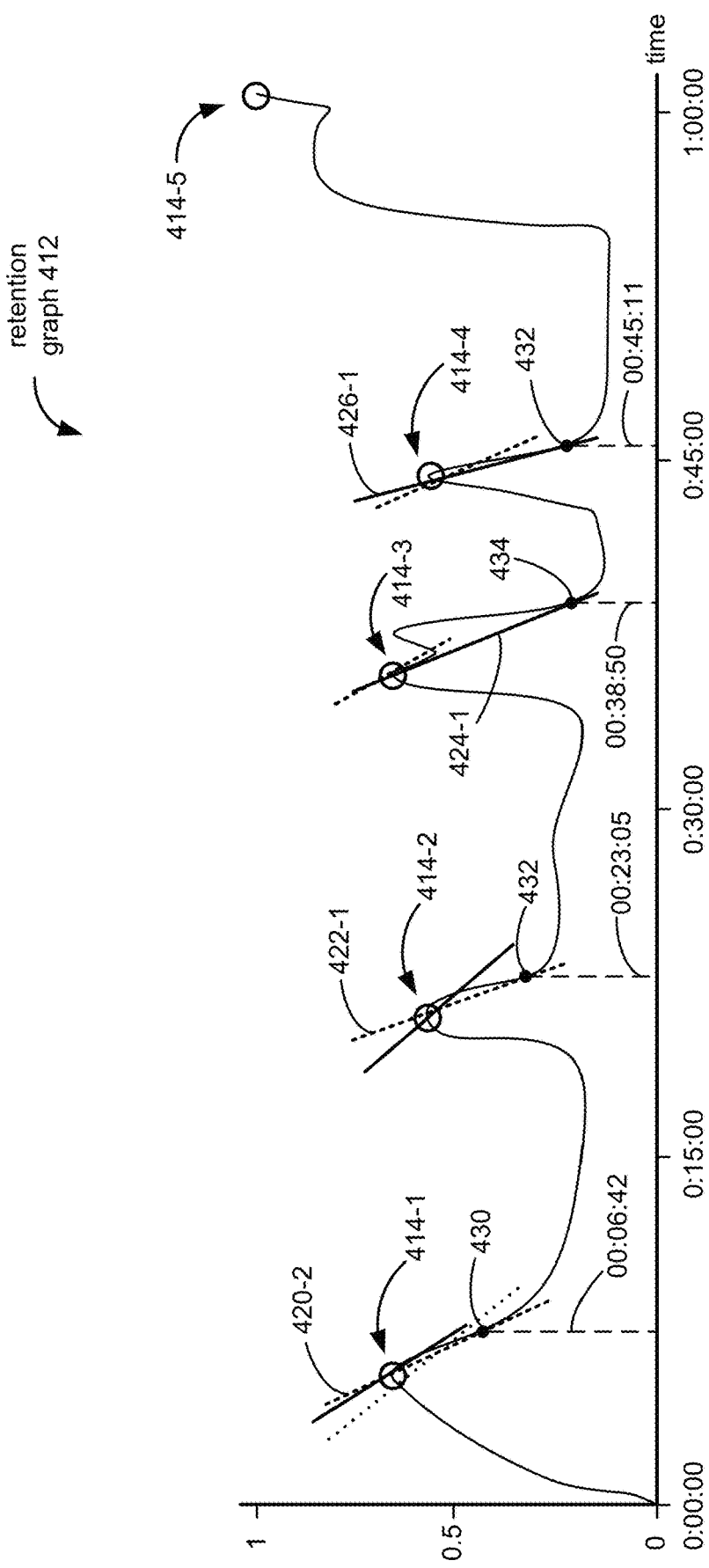
Figure 5C:
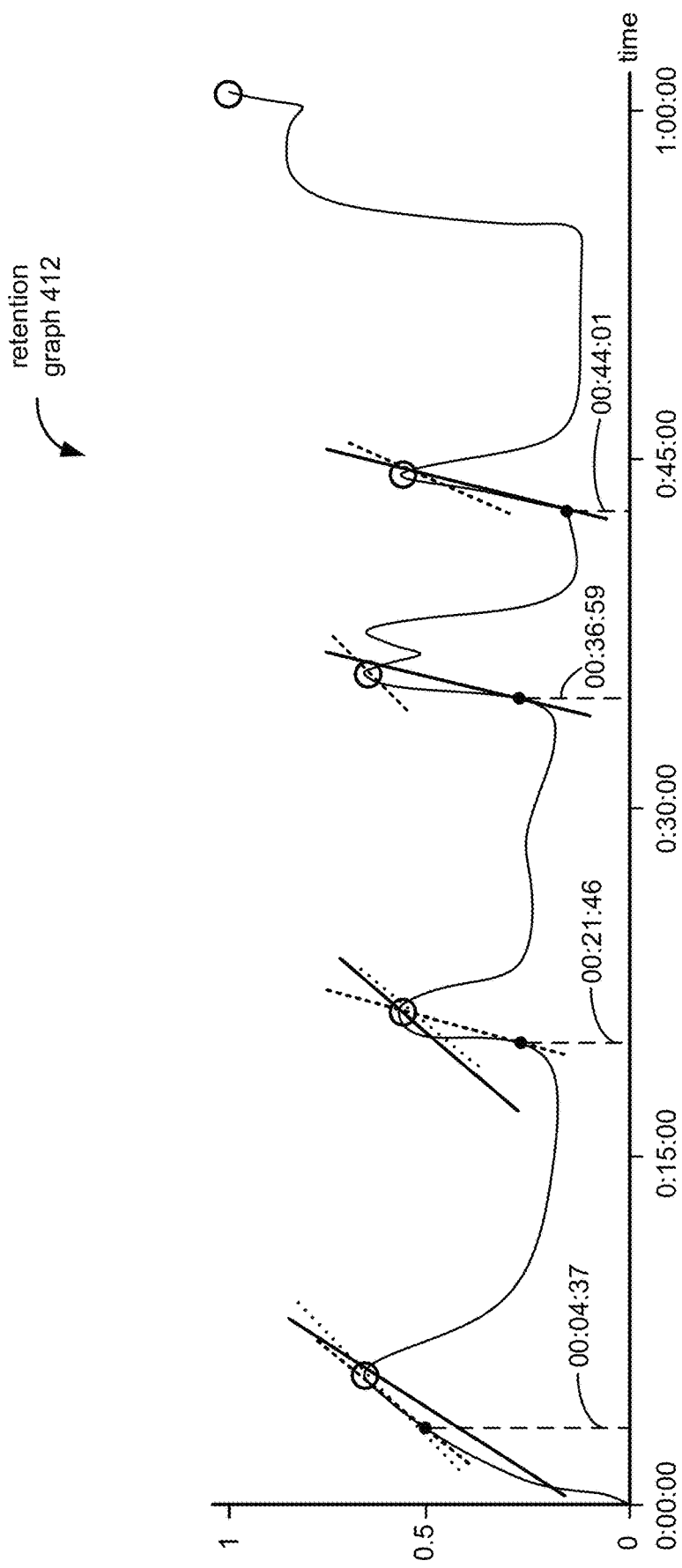

FIGS. 5B and 5C illustrate using the calculated secants to determine a respective end time and a respective start time for an identified extremum 414. FIG. 5B shows the secants calculated for points that are within a +60 seconds time frame from a respective identified extremum 414. In some embodiments, the secant with the largest slope magnitude (or in this case, the largest negative slope) is selected. In this example, secant 420-2 is selected for extremum 414-1, secant 422-1 is selected for extremum 414-2, secant 424-1 is selected for extremum 414-3, and secant 426-1 is selected for extremum 414-4. As previously mentioned, each secant intersects the retention graph 412 at a first intersecting point corresponding to the location of an identified extremum, and at a second intersecting point. A time (e.g., x-axis value) associated with the second intersecting point of the selected secant (e.g., secant with largest negative slope) and the retention graph 412 is identified as an end time corresponding to the identified extremum. For example, FIG. 5B shows that extremum 414-1 has an end time 430 of 00:06:42 (hh:mm:ss), extremum 414-2 has an end time 432 of 00:23:05 (hh:mm:ss), extremum 414-3 has an end time 434 of 00:38:50 (hh:mm:ss), and extremum 414-4 has an end time of 00:45:11 (hh:mm:ss).

FIG. 5C shows a subset of secants calculated for points that are within a −60 seconds time frame from a respective identified extremum 414. In some embodiments, the secant with the largest slope magnitude (or in this case, the largest positive slope) is selected. As previously mentioned, each secant intersects the retention graph 412 at a first intersecting point corresponding to the location of an identified extremum, and at a second intersecting point. A time (e.g., x-axis value) associated with the second intersecting point of the selected secant (e.g., secant with largest negative slope) and the retention graph 412 is identified as a start time corresponding to the identified extremum. For example, FIG. 5C shows that extremum 414-1 has a start time of 00:04:37 (hh:mm:ss), extremum 414-2 has a start time of 00:21:46 (hh:mm:ss), extremum 414-3 has a start time of 00:36:59 (hh:mm:ss), and extremum 414-4 has a start time of 00:44:01 (hh:mm:ss).

Figure 5D:
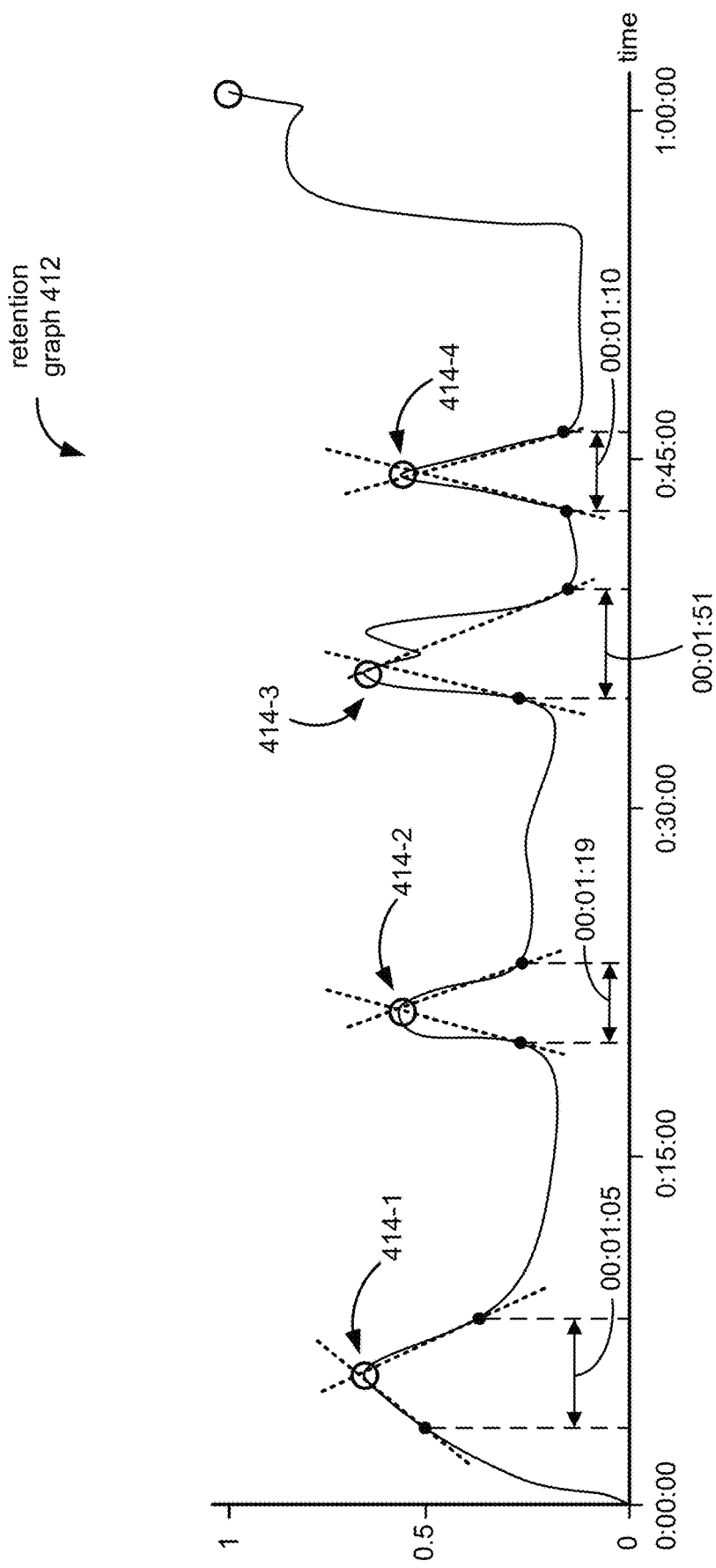

An estimated duration corresponding to an identified extremum can be determined based on the start and end times associated with each extremum. As shown in FIG. 5D, extremum 414-1 has a duration of 00:01:05 (hh:mm:ss), extremum 414-2 has a duration of 00:01:19 (hh:mm:ss), extremum 414-3 has a duration of 00:01:21 (hh:mm:ss), and extremum 414-4 has a duration of 00:01:52 (hh:mm:ss). The duration corresponding to each extremum can be used to determine whether or not the extremum corresponds to sub-content. For example, a predefined criteria for determining sub-content may include a minimum and/or maximum time duration. For example, the predefined criteria includes a maximum time duration of 90 seconds such that an extremum having a duration that is less than 90 seconds is considered to include sub-content (e.g., an advertisement) and that an extremum having a duration that is 90 seconds or greater is considered to not correspond to (e.g., not include) sub-content. In such cases, the extrema 414-1, 414-2, and 414-4 are determined to correspond to (e.g., include) sub-content since they all have durations that are less than 90 seconds. In contrast, extremum 414-3 is determined to not correspond to (e.g., not include) sub-content since the duration of extremum 414-3 is greater than 90 seconds.

In some embodiments, in accordance with a determination that a respective extremum is determined to correspond to sub-content, the start and end times for the respective extremum are stored as start and end times, respectively, for the sub-content.

Figure 6A:
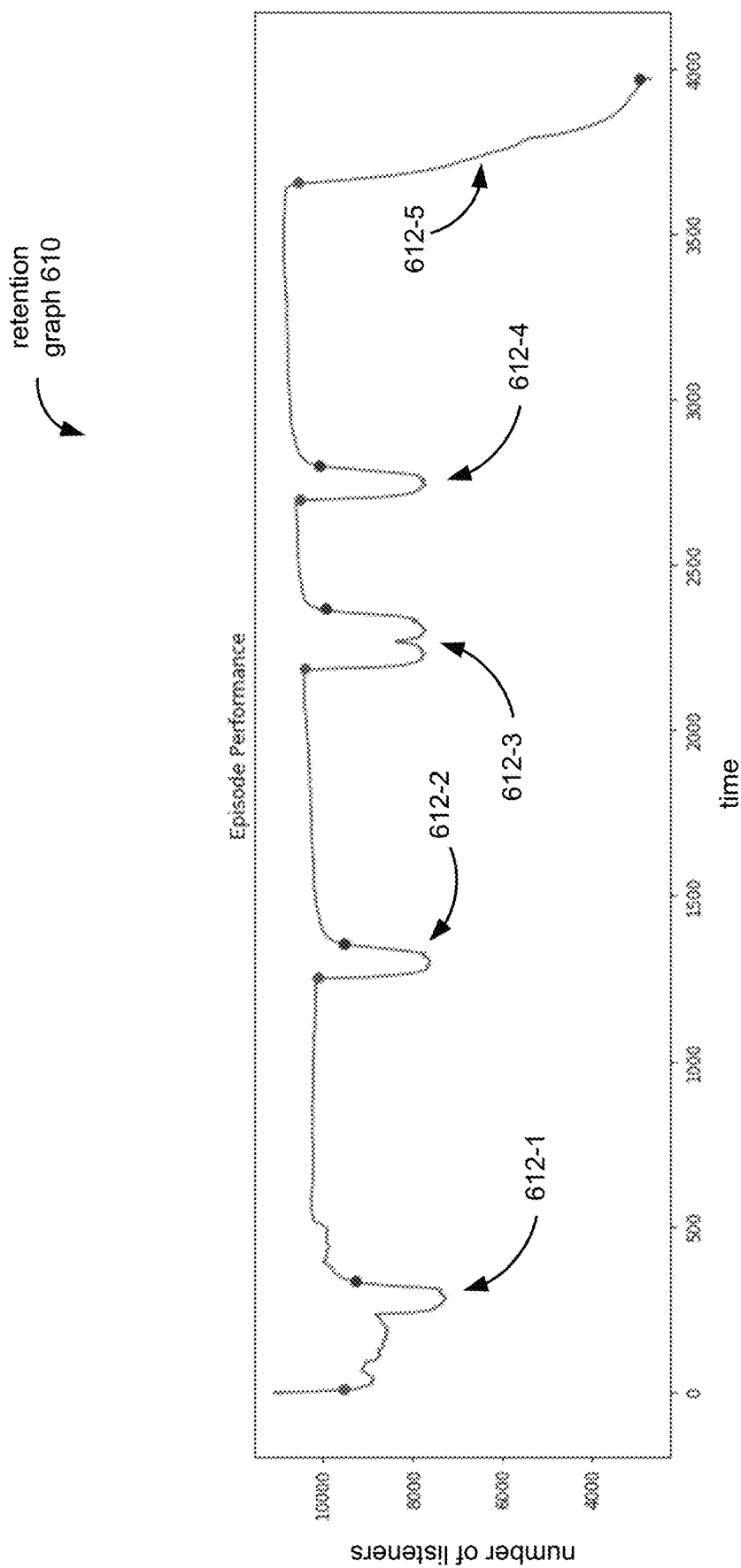
FIGS. 6A-6C illustrate analysis of an inverted retention graph using derivatives, in accordance with some embodiments.

FIG. 6A illustrates an example of a retention graph 610 in accordance with some embodiments. The retention graph 610 shows a number of listeners for each portion (or segment) of a podcast run time. In this example, the number of listeners is represented by a raw count. Extrema 612-1 through 612-5 (e.g., dips) in the retention graph 610 correspond to decreases in listener retention. A start time and an end time is determined for each extremum 612 (e.g., dip) based on the second derivative. In some implementations, a duration corresponding to each extremum 612 (e.g., dip) is determined (e.g., calculated) based on the start and end times of the extremum 612.

Figure 6B:
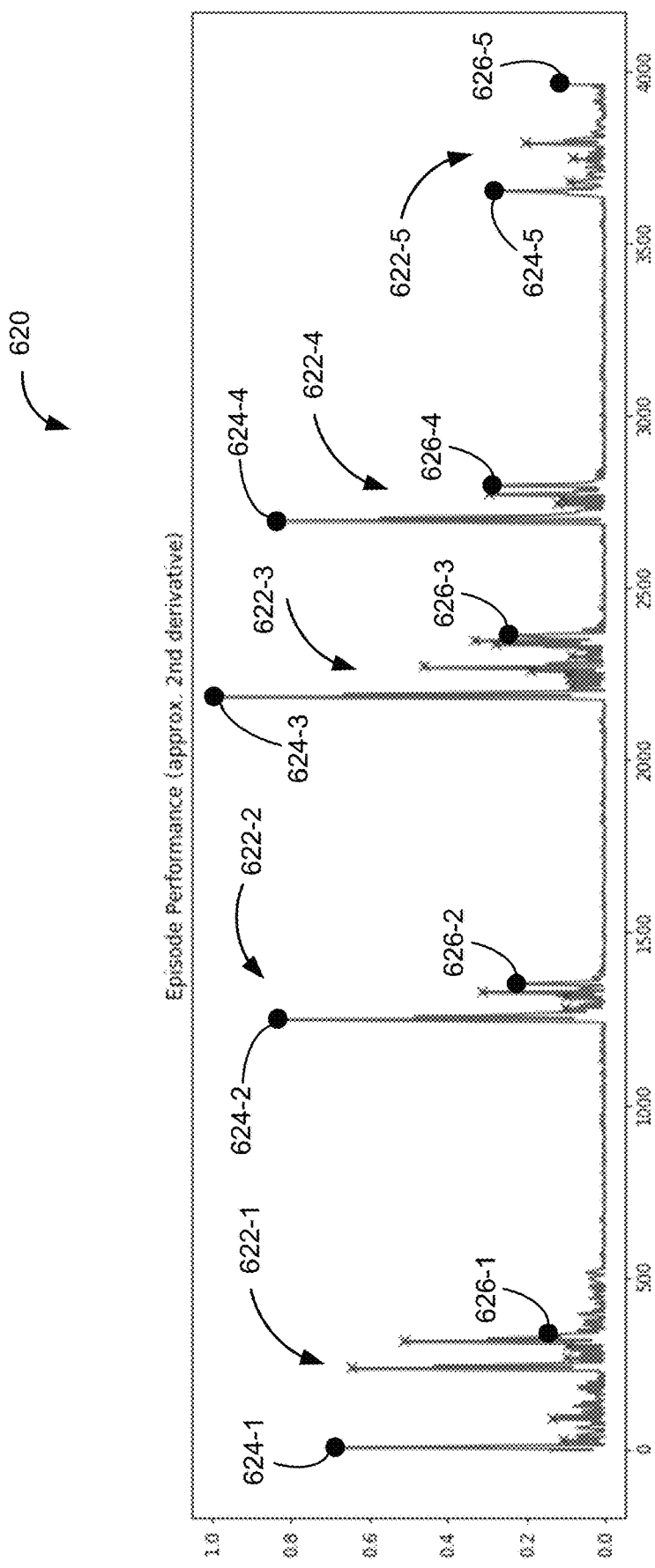

FIG. 6B illustrates a graph 620 showing the second derivative of the retention graph 610. In some implementations, as shown, the graph 620 is an absolute-valued and normalized second derivative of the retention graph 610. A peak detection algorithm is applied to graph 620 and for each set of peaks (corresponding to an extremum or dip in the retention graph 610), a first peak and a last peak is identified. For example, graph 620 includes five sets of peaks 622-1 through 622-5, each set of peaks 622 corresponding to an extremum 612 (e.g., dip) of retention graph. For each set of peaks 622, a first peak and a last peak is identified. The identified first peak 624 of each set of peaks 622 corresponds to a start time of a respective extremum 612, and the identified last peak 626 of each set of peaks 622 corresponds to an end time of a respective extremum 612. For example, for the first set of peaks 622-1, a time corresponding to the first peak 624-1 is identified as the start time of extremum 612-1, and time corresponding to the last peak 626-1 is identified as the end time of extremum 612-1.

Figure 6C:
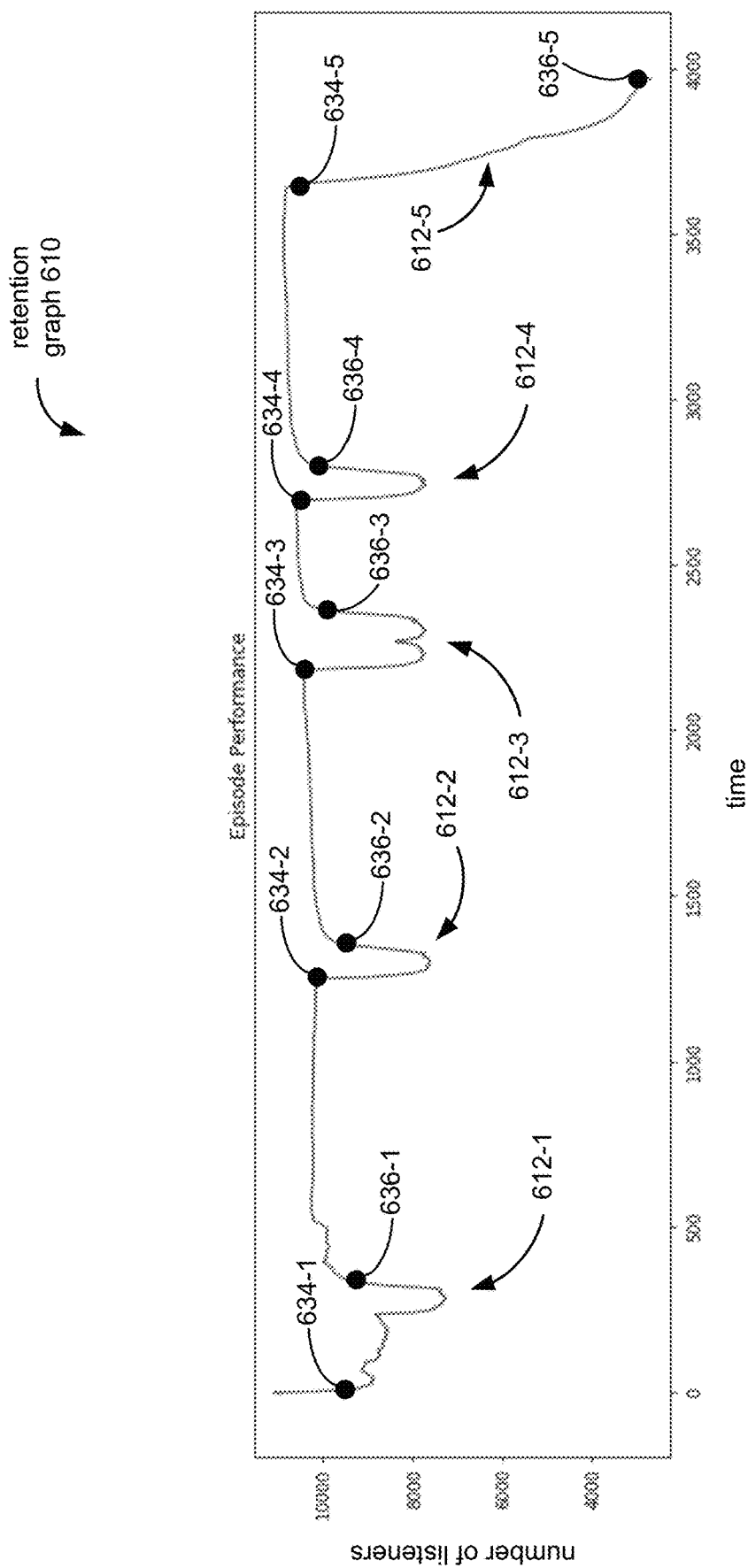

FIG. 6C illustrates the retention graph 610 that includes determined (e.g., identified, calculated) start times 634 and end times 636 corresponding to each extremum 612 as determined using the second derivative graph 620.

In some embodiments, the start and end times for the respective extremum are stored as start and end times, respectively, for sub-content.

Figure 7A:
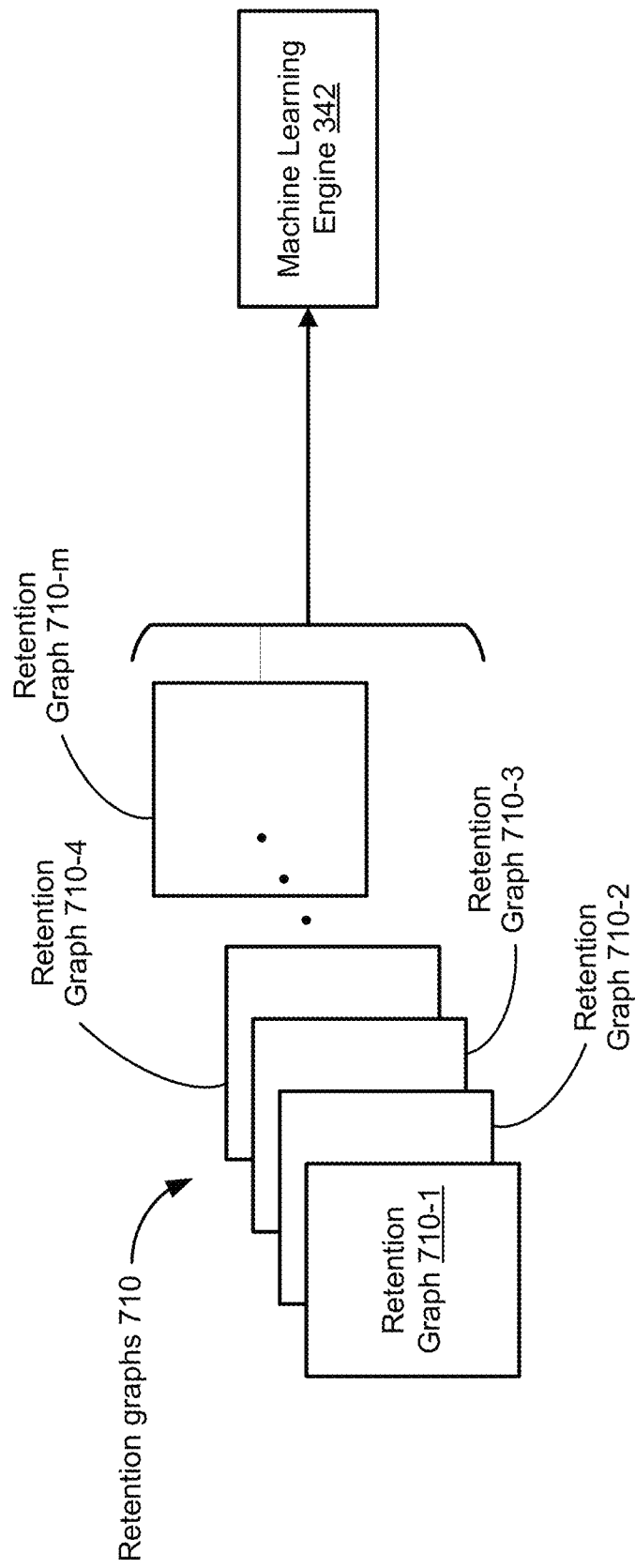
FIG. 7A illustrates training a machine learning model using retention graphs, in accordance with some embodiments.

FIG. 7A illustrates training a machine learning engine 324 (e.g., machine learning model) using retention graphs 710, in accordance with some embodiments. In order to train the model (e.g., machine learning model or machine learning algorithm), the machine learning engine 324 receives a plurality of retention graphs 710 that each represent listener retention for different media content items. For example, a first retention graph 710-1 may include information regarding listener retention for a first episode of a first podcast series, a second retention graph 710-2 may include information regarding listener retention for a second episode of a first podcast series, and a third retention graph 710-3 may include information regarding listener retention for an episode of a second podcast series that is different from the first podcast series. Each retention graph 710 includes information such as an identifier corresponding to the media content item (e.g., episode 5 of "Crime Time" podcast), location (e.g., position, time) of extrema in the retention graph 710 (e.g., tagged ground-truth information indicating the positions of extrema), and an indication of which extrema correspond to (e.g., include) sub-content (e.g., tagged ground-truth information indicating whether the respective extrema correspond to sub-content). In some embodiments, the retention graph 710 may also include additional information such as start time(s), end time(s), and duration(s) of extrema in the retention graph 710. The retention graphs 710 and corresponding information are used to train the machine learning engine 342 to associate a media content identifier (e.g., podcast name) with locations (e.g., position, time) of extrema in the retention graph 710 that are identified (e.g., indicated) as corresponding to (e.g., including) sub-content.

Figure 7B:
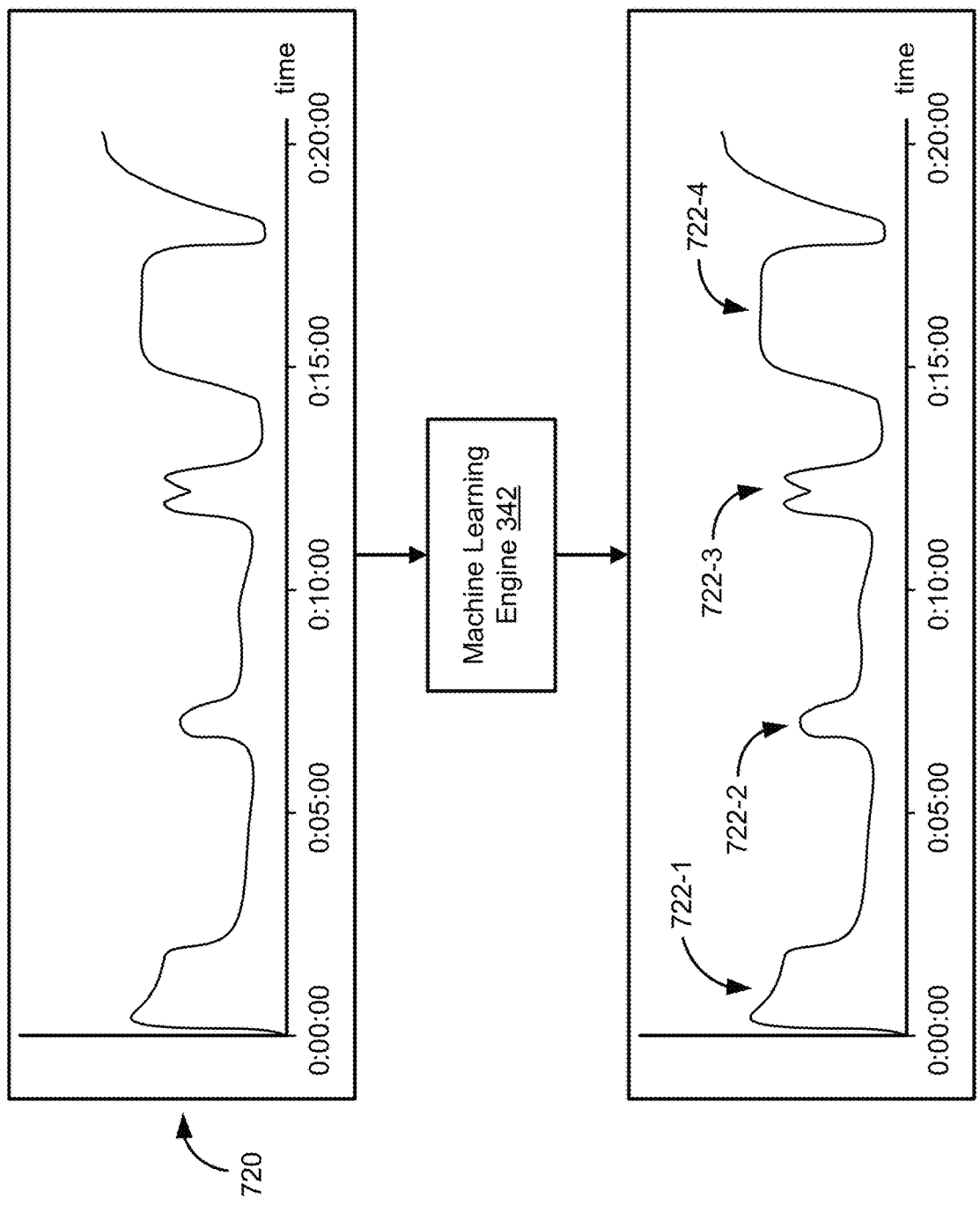
FIG. 7B illustrates using a trained machine learning model, in accordance with some embodiments.
Figure 8B:
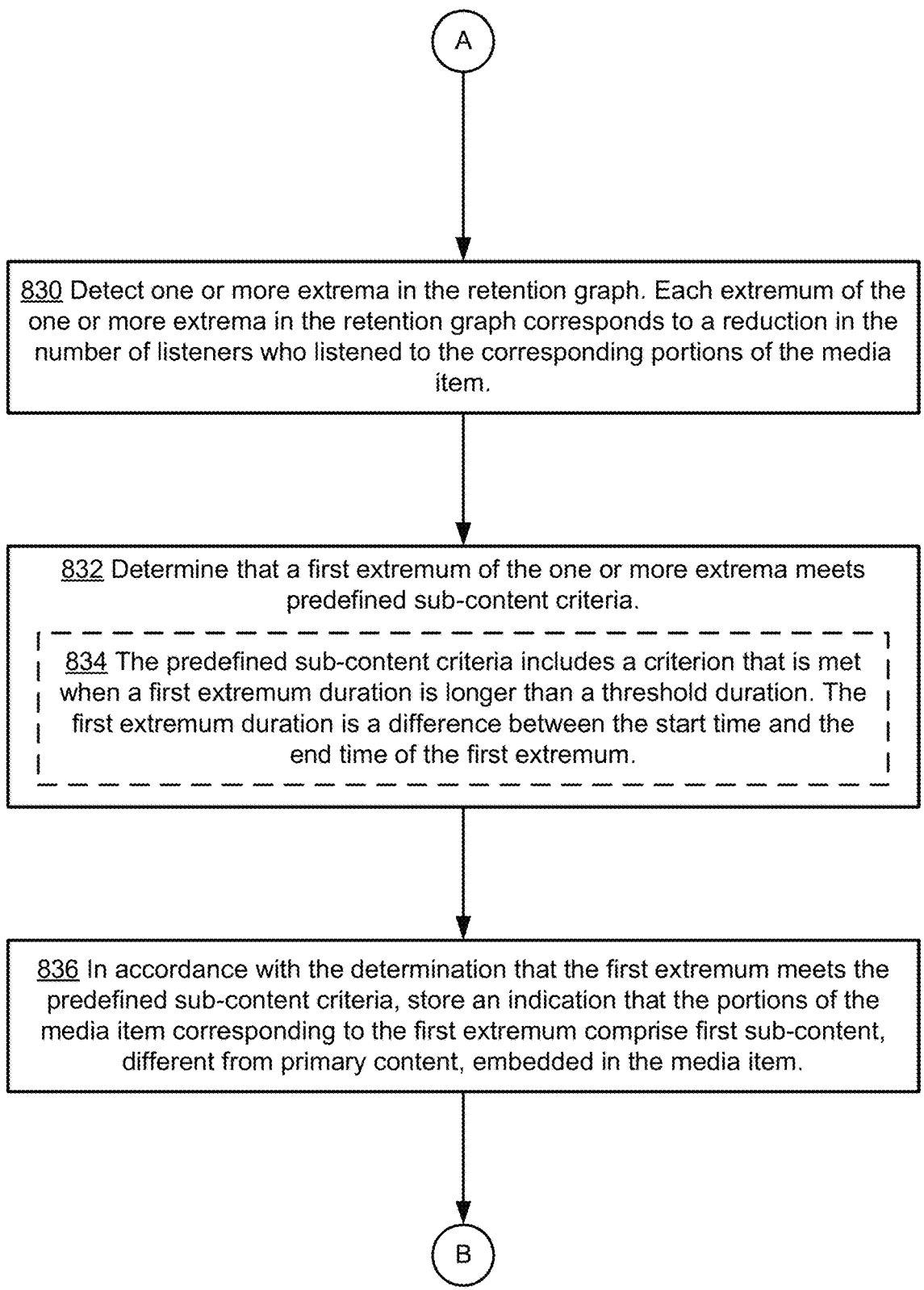
Figure 8C:
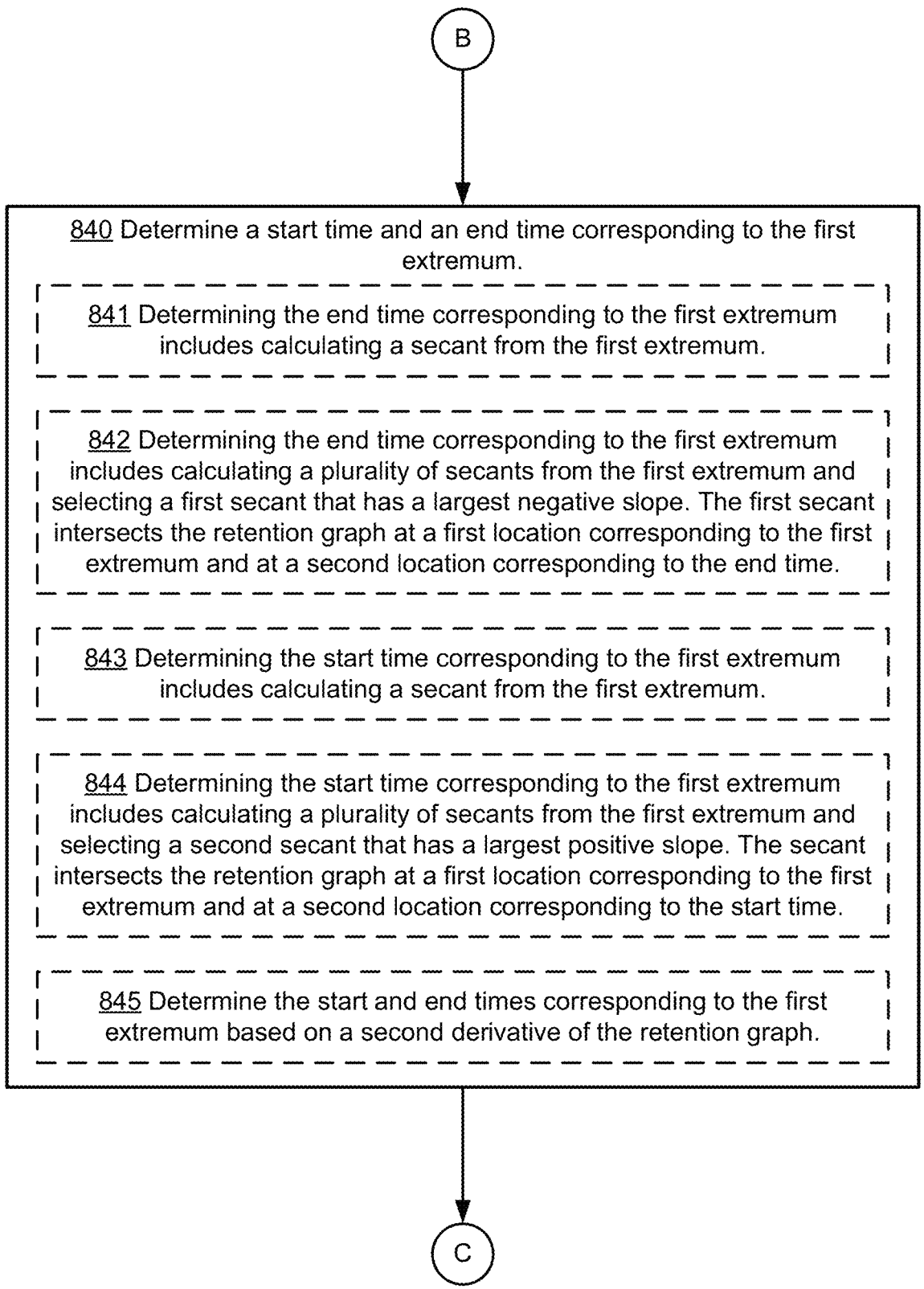
Figure 8D:
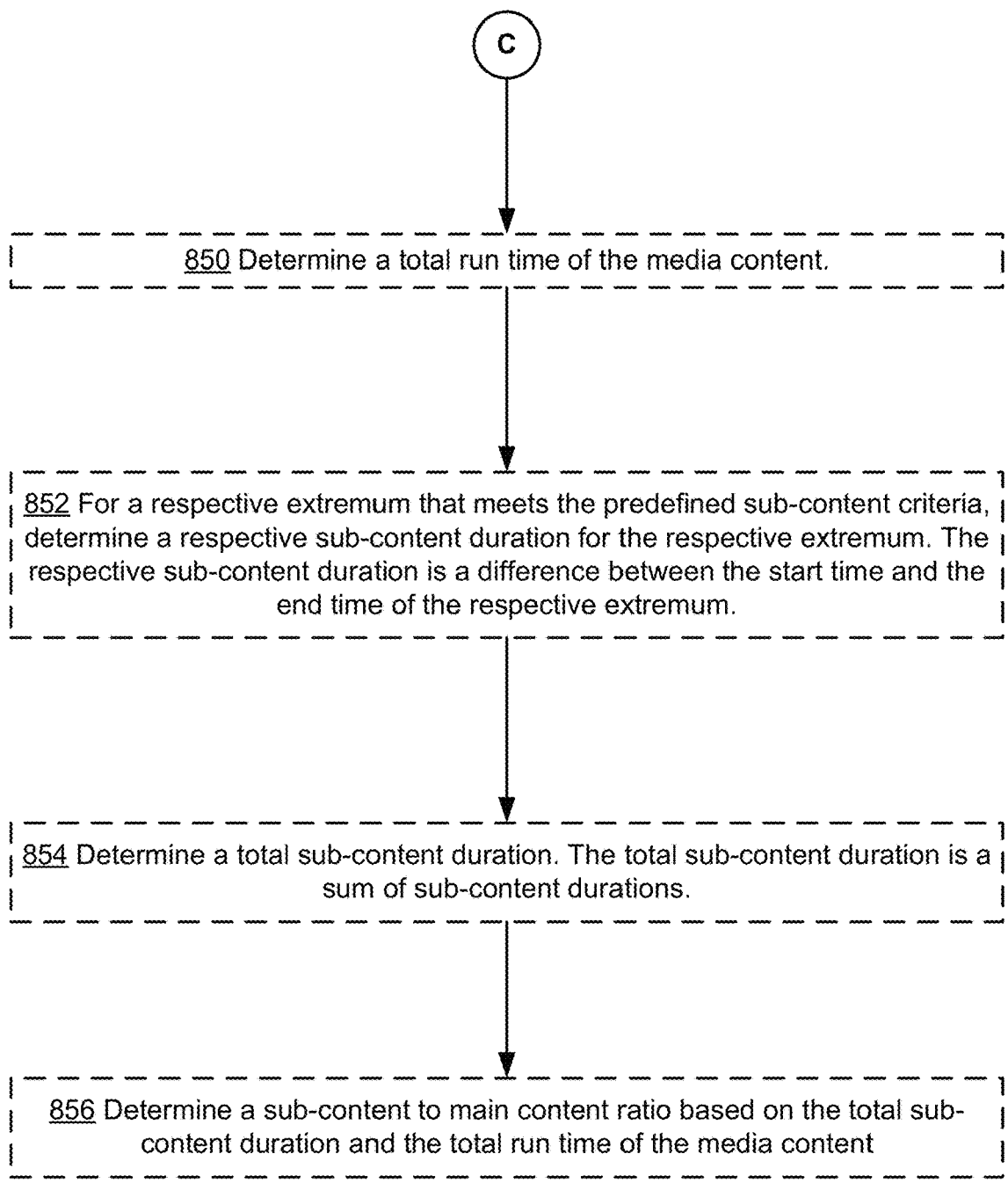
Figure 8E:
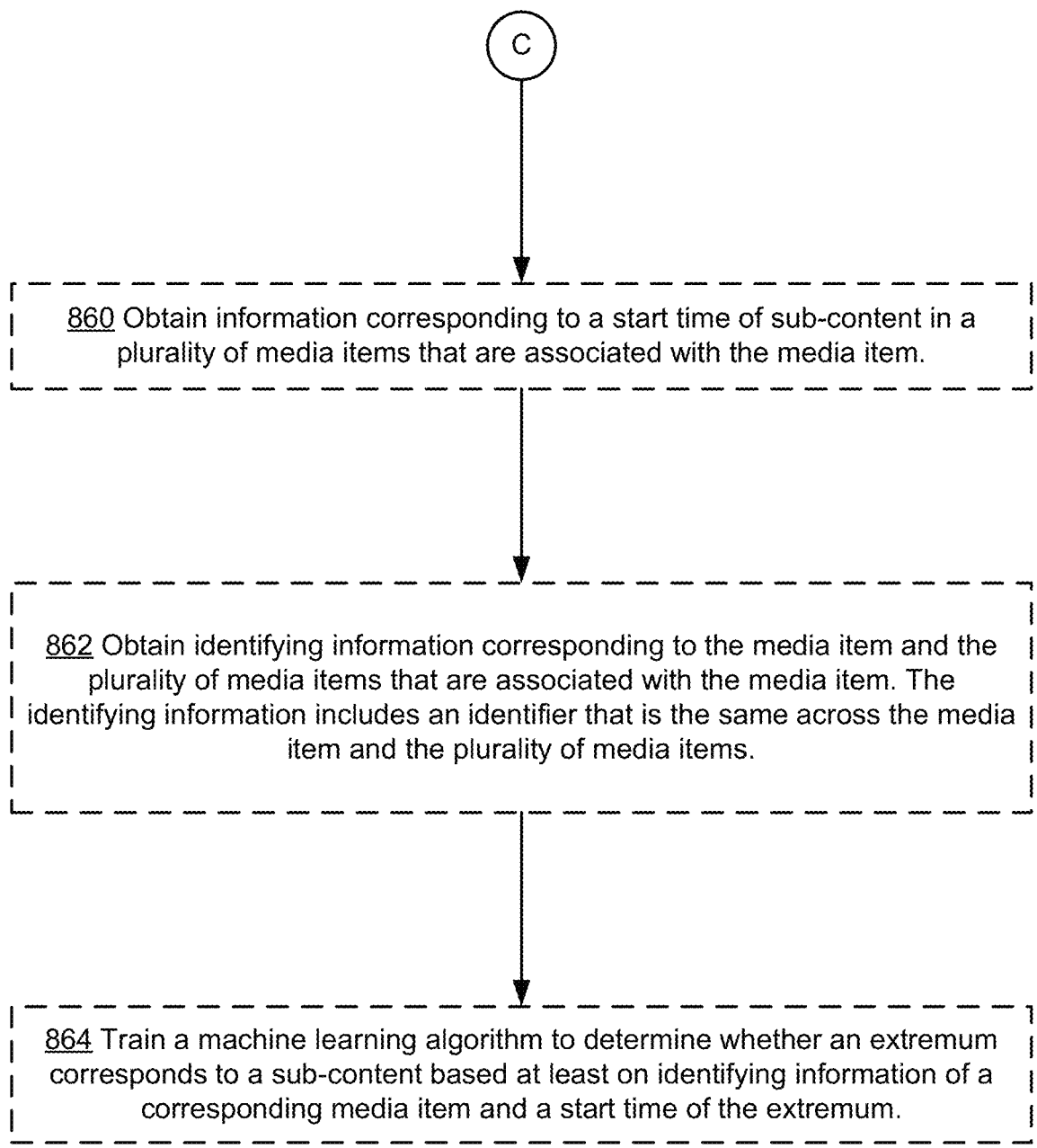
Figure 8F:
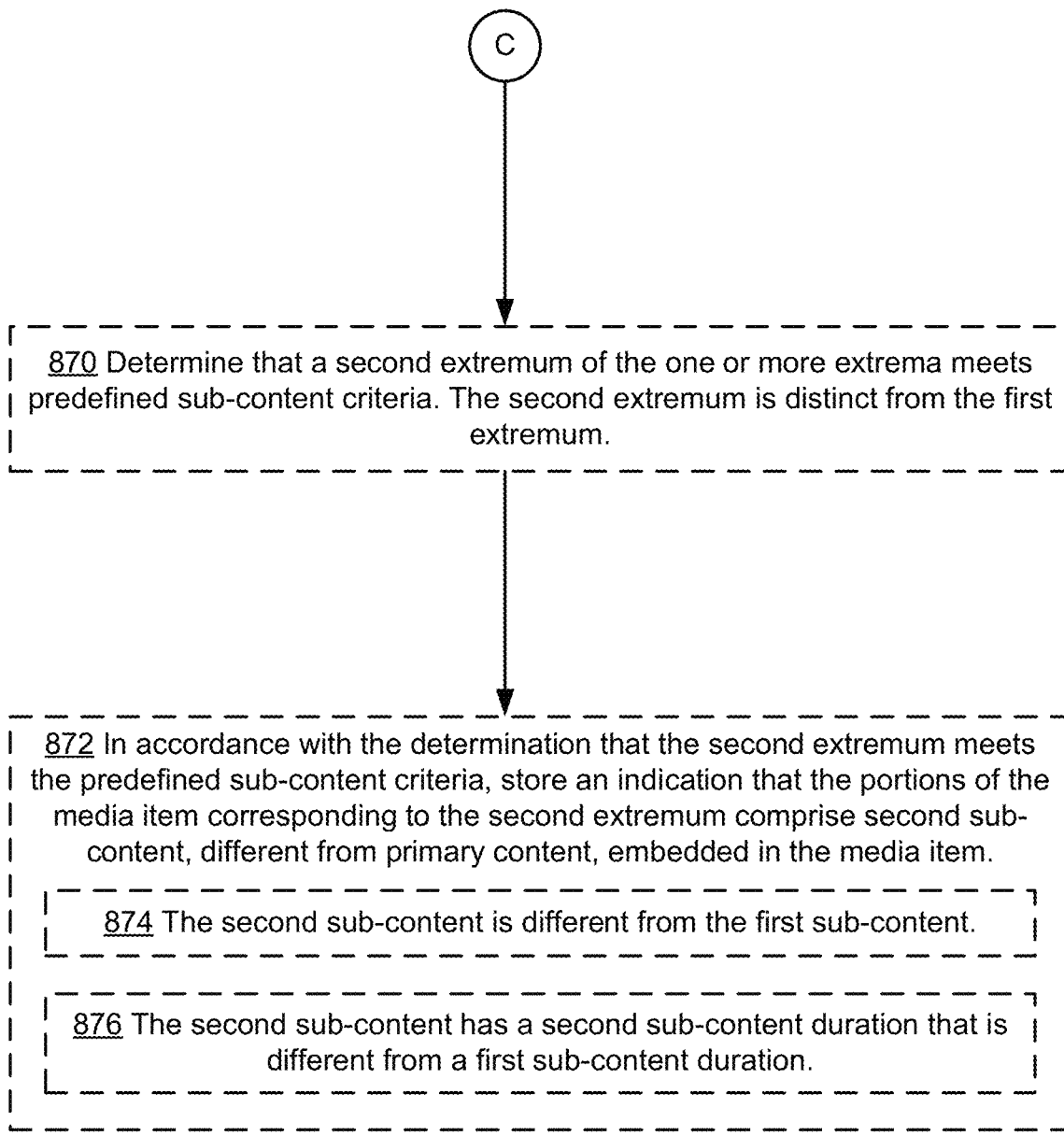
Figure 8G:
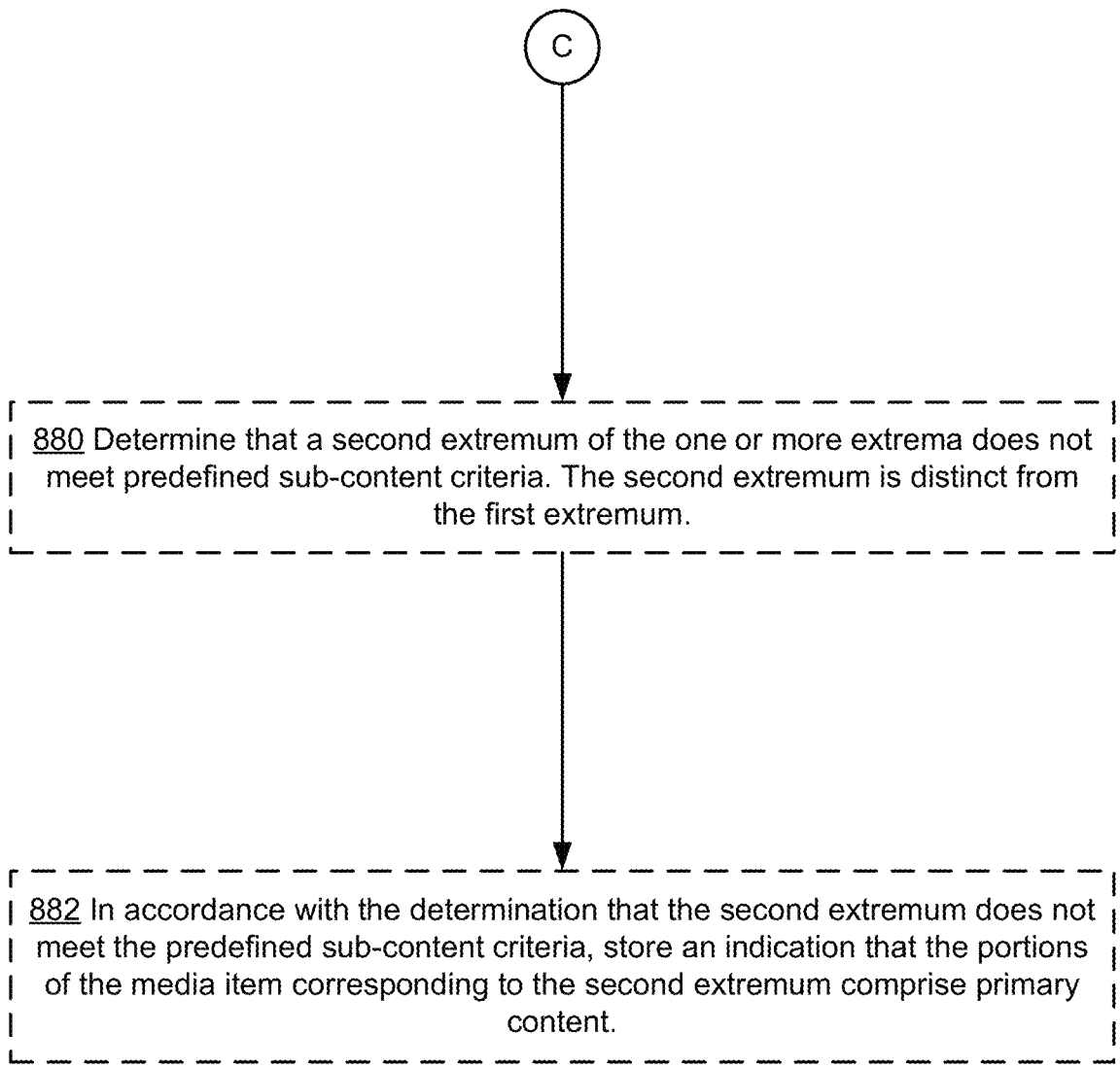

FIG. 7B illustrates using a trained machine learning model to determine whether an identified extremum in a new retention graph corresponds to (e.g., includes) sub-content, in accordance with some embodiments. The trained machine learning engine 342 receives an input retention graph 720 (e.g., a new retention graph). In some embodiments, as shown, the input retention graph 720 has been smoothed, inverted, and normalized. In some embodiments, the extrema in the input retention graph 720 have been identified such that positions (e.g., location, time) of extrema are known. In some embodiments, a peak detection algorithm has not been applied (e.g., performed) to the input retention graph and thus, the positions (e.g., location, time) of extrema have not yet been identified.

In response to receiving the input retention graph 720, the machine learning engine 342 determines, for each identified extremum, whether the extremum corresponds to (e.g., includes) sub-content. In some embodiments, such as when extremum in the input retention graph 720 have not yet been identified, the machine learning engine 342 also identifies positions (e.g., location, time) of extrema in the input retention graph 720.

For example, a podcast series called "History Time" typically has a run time of approximately 20 minutes. Each episode of the "History Time" podcast typically includes a generic introduction at the beginning of the show, a short advertisement (e.g., ~15 second advertisement) at around the 7 minute mark, a longer advertisement near the 12 minute mark (e.g., ~1 minute long advertisement segment), and a musical interlude towards the end of the episode (e.g., near or after the 15 minute mark) that lasts for at least (e.g., a minimum of 3 minutes). As part of training the machine learning engine 342, one or more retention graphs 710 may include episodes of the "History Time" podcast and thus, in response to receiving an input retention graph 720 that is an episode of the "History Time" podcast, the machine learning engine 342 may be able to automatically determine (e.g., designate, label) which extrema in the input retention graph 720 correspond to sub-content (e.g., advertisements) and which extrema in the input retention graph 720 do not correspond to (e.g., do not include) sub-content (e.g., advertisements). For example, if input retention graph 720 is identified (e.g., in the metadata or by an identifier) to be an episode of the "History Time" podcast, the machine learning engine 342 may determine that the first extremum 722-1 corresponds to an introduction, the second extremum 722-2 and the third extremum 722-3 each correspond to advertisements, and the fourth extremum 722-4 corresponds to a musical interlude that is part of the main programming.

FIGS. 8A-8G are flow diagrams illustrating a method 800 of identifying the presence of sub-content in a media content item, in accordance with some embodiments. Method 800 may be performed (802) at an electronic device (e.g., media content server 104) having one or more processors and memory storing instructions for execution by the one or more processors. In some embodiments, the method 800 is performed by executing instructions stored in the memory (e.g., memory 306, FIG. 3) of the electronic device.

In performing the method 800, an electronic device obtains (810) a listening history for a media item. The listening history includes retention information indicating, for each respective portion of a plurality of portions of the media item, a number of listeners who listened to the respective portion of the media item. The electronic device uses the retention information to generate (820) a retention graph (e.g., retention graph 124, 412, 610). The retention graph represents the number of listeners who listened to corresponding portions of the media item as a function of time. The electronic device detects (830) one or more extrema in the retention graph (e.g., extrema 414-1 to 414-5 in retention graph 412, extrema 612-1 to 612-5 in retention graph 610). Each extremum of the one or more extrema in the retention graph (e.g., retention graph 124, 412, 610) corresponds to a reduction in the number of listeners who listened to the corresponding portions of the media item. The electronic device determines (832) that a first extremum of the one or more extrema meets predefined sub-content criteria. In accordance with the determination that the first extremum meets the predefined sub-content criteria, the electronic device stores (836) an indication that the portions of the media item corresponding to the first extremum comprise first sub-content, different from primary content, embedded in the media item. The electronic device also determines (800) a start time and an end time corresponding to the first extremum. For example, as shown in FIGS. 5D and 6C, start and end times are determined for each extremum 414 and 612 of retention graphs 412 and 610, respectively.

In some embodiments, the retention information includes (812) a subset, less than all, of listeners who interacted with the media item and meet predefined listener criteria. For example, the retention information may include listening history of listeners who listened to (e.g., played, streamed) at least 20 minutes of the media content item. In another example, the retention information may include listening history of listeners who listened to (e.g., played, streamed) at least 50% of the media content item.

In some embodiments, the retention information is generated (814) at a server system (e.g., media content server 104) that is distinct and remote from a user device (e.g., electronic device 102) configured to present the media content to a listener.

In some embodiments, the media item does not include (816) a video (and thus scene recognition based on images is not available for determining the presence of sub-content). For example, the media item can be any of: an audio book, a podcast, a song, a music album, and an audio book. In another example, the media content item is not any of: a television show, a television program, a movie, a YouTube video, and a social media video.

In some embodiments, generating the retention graph 412 or 610 includes (824) aggregating the retention information and smoothing, inverting, and normalizing the retention graph 412 or 610. For example, FIG. 4A shows a retention graph 410 before inversion and normalization, and FIG. 4A shows a retention graph 412 that is a retention graph 412 generated by inverting and normalizing the retention graph 410. In some embodiments, smoothing the retention graph includes applying a moving average. In some embodiments, inverting the retention graph means vertically flipping the retention graph such that a reduction in listenership is represented as a peak rather than a trough. In some embodiments, normalizing the retention graph includes scaling the retention graph so that it's values range from zero to one (or, e.g., 0% to 100%).

In some embodiments, the predefined sub-content criteria includes a criterion that is met when a first extremum duration is longer than a threshold duration. The first extremum duration is a difference between the start time and the end time of the first extremum. For example, FIG. 5D shows retention graph 412 and the determined (e.g., calculated) extremum duration for extrema 414-1 through 414-4. In this example, the extremum 414-3 is considered not to include sub-content since the extremum duration for extremum 414-3 (1 minute and 51 seconds, e.g., 111 seconds) is longer than a threshold duration of 90 seconds.

In some embodiments, determining the end time corresponding to the first extremum includes (841) calculating a secant from the first extremum. For example, FIGS. 5A and 5B show calculating at least one secant from an extremum.

In some embodiments, determining the end time corresponding to the first extremum includes (842) calculating a plurality of secants from the first extremum and selecting a first secant that has a largest negative slope. The first secant intersects the retention graph at a first location corresponding to the first extremum and at a second location corresponding to the end time. For example, FIG. 5B shows selecting a secant that has a largest negative slope such that the second point of the secant that intersects with the retention graph 412 is the end time for a respective extremum.

In some embodiments, determining the start time corresponding to the first extremum includes calculating a secant from the first extremum. For example, FIG. 5C shows calculating at least one secant from an extremum.

In some embodiments, determining the start time corresponding to the first extremum includes (844) calculating a plurality of secants from the first extremum and selecting a second secant that has a largest positive slope. The secant intersects the retention graph at a first location corresponding to the first extremum and at a second location corresponding to the start time. For example, FIG. 5C shows selecting a secant that has a largest positive slope such that the second point of the secant that intersects with the retention graph 412 is the start time for a respective extremum.

In some embodiments, the electronic device determines (845) the start and end times corresponding to the first extremum based on a second derivative of the retention graph. FIGS. 6B and 6C illustrate determining the start and end times corresponding to a respective extremum 612 of retention graph 610 using the second derivative (e.g., graph 620) of the retention graph 610. In some embodiments, the start and end time for the first extremum are stored as a start and end time for embedded sub-content.

In some embodiments, the electronic device also determines (850) a total run time of the media content. For a respective extremum that meets the predefined sub-content criteria, the electronic device determines (852) a respective sub-content duration for the respective extremum. The respective sub-content duration is a difference between the start time and the end time of the respective extremum. The electronic device also determines (854) a total sub-content duration. The total sub-content duration is a sum of sub-content durations. The electronic device further determines (856) a sub-content to main content ratio based on the total sub-content duration and the total run time of the media content.

In some embodiments, the electronic device obtains (860) information corresponding to a start time of sub-content in a plurality of media items that are associated with the media item, as well as (862) identifying information corresponding to the media item and the plurality of media items that are associated with the media item. The identifying information includes an identifier that is the same across the media item and the plurality of media items (e.g., the identifying information is for a podcast series, and each of the plurality of media items is an episode in the podcast series). The electronic device then trains (864) a machine learning algorithm (e.g., machine learning engine 342) to determine whether an extremum corresponds to a sub-content based at least on identifying information of a corresponding media item and a start time of the extremum. An example of training the machine learning algorithm (e.g., machine learning engine 342) using retention graphs 710 is shown in FIG. 7A, and an example of using machine learning algorithm (e.g., machine learning engine 342) to determine whether an extremum in a new retention graph 720 corresponds to a sub-content is shown in FIG. 7B.

Although FIGS. 8A-8G illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method comprising:
at an electronic device with one or more processors and memory, the electronic device being associated with a media-providing service:
obtaining a listening history for a media item, the listening history including retention information indicating, for each respective portion of a plurality of portions of the media item, a number of listeners who listened to the respective portion of the media item;
using the retention information, generating a retention graph representing the number of listeners who listened to corresponding portions of the media item as a function of time;
detecting one or more extrema in the retention graph, wherein each extremum of the one or more extrema in the retention graph corresponds to a reduction in the number of listeners who listened to the corresponding portions of the media item;
determining that a first extremum of the one or more extrema meets predefined sub-content criteria; and
in accordance with the determination that the first extremum meets the predefined sub-content criteria, storing an indication that the portions of the media item corresponding to the first extremum comprise first sub-content, different from primary content, embedded in the media item.

2. The method of claim 1, further comprising:
determining a start time and an end time corresponding to the first extremum.

3. The method of claim 2, wherein determining the end time corresponding to the first extremum includes calculating a secant from the first extremum.

4. The method of claim 3, further including:
calculating a plurality of secants from the first extremum; and
selecting a first secant that has a largest negative slope, wherein the first secant intersects the retention graph at a first location corresponding to the first extremum and at a second point corresponding to the end time.

5. The method of claim 2, wherein determining the start time corresponding to the first extremum includes calculating a secant from the first extremum.

6. The method of claim 5, further including:
calculating a plurality of secants from the first extremum; and
selecting a second secant that has a largest positive slope, wherein the second secant intersects the retention graph at a first location corresponding to the first extremum and a second location corresponding to the start time.

7. The method of claim 2, further including determining the end time corresponding to the first extremum based on a second derivative of the retention graph.

8. The method of claim 2, wherein:
the predefined sub-content criteria includes a criterion that is met when a first extremum duration is longer than a threshold duration; and
the first extremum duration is a difference between the start time and the end time of the first extremum.

9. The method of claim 2, the method further comprising:
determining a total run time of the media item;
for a respective extremum that meets the predefined sub-content criteria, determining a respective sub-content duration for the respective extremum, wherein the respective sub-content duration is a difference between the start time and the end time of the respective extremum;
determining a total sub-content duration, wherein the total sub-content duration is a sum of sub-content durations; and
determining a ratio of sub-content to main content based on the total sub-content duration and the total run time of the media item.

10. The method of claim 1, wherein generating the retention graph comprises aggregating the retention information, the method further comprising:
smoothing, inverting, and normalizing the retention graph.

11. The method of claim 1, wherein the retention information is generated at a server system that is distinct and remote from a user device configured to present the media item to a listener.

12. The method of claim 1, wherein the media item does not include a video.

13. The method of claim 1, further comprising:
obtaining information corresponding to a start time of sub-content in a plurality of media items that are associated with the media item;
obtaining identifying information corresponding to the media item and the plurality of media items that are associated with the media item, wherein the identifying information includes an identifier that is the same across the media item and the plurality of media items; and
training a machine learning algorithm to determine whether an extremum corresponds to a sub-content based at least on identifying information of a corresponding media item and a start time of the extremum.

14. The method of claim 1, further comprising:
determining that a second extremum of the one or more extrema meets predefined sub-content criteria, the second extremum being distinct from the first extremum; and
in accordance with the determination that the second extremum meets the predefined sub-content criteria, storing an indication that the portions of the media item corresponding to the second extremum comprise second sub-content, different from primary content, embedded in the media item.

15. The method of claim 14, wherein the second sub-content is different from the first sub-content.

16. The method of claim 14, wherein the second sub-content has a second sub-content duration that is different from a first sub-content duration.

17. The method of claim 14, further comprising:
determining that a second extremum of the one or more extrema does not meet predefined sub-content criteria, the second extremum being distinct from the first extremum; and
in accordance with the determination that the second extremum does not meet the predefined sub-content criteria, storing an indication that the portions of the media item corresponding to the second extremum comprise primary content.

18. A server system of a media-providing service, comprising:
one or more processors; and
memory storing one or more programs for execution by the one or more processors, the one or more programs comprising instructions for performing:
obtaining a listening history for a media item, wherein the listening history includes retention information indicating, for each respective portion of a plurality of portions of the media item, a number of listeners who listened to the respective portion of the media item;
using the retention information, generating a retention graph representing the number of listeners who listened to corresponding portions of the media item as a function of time;
detecting one or more extrema in the retention graph, wherein each extremum of the one or more extrema in the retention graph corresponds to a reduction in the number of listeners who listened to the corresponding portions of the media item;
determining that a first extremum of the one or more extrema meets predefined sub-content criteria; and
in accordance with the determination that the first extremum meets the predefined sub-content criteria, storing an indication that the portions of the media item corresponding to the first extremum comprise first sub-content, different from primary content, embedded in the media item.

19. A non-transitory computer-readable storage medium storing one or more programs configured for execution by a server system of a media-providing service, the one or more programs comprising instructions for performing a set of operations, comprising:
obtaining a listening history for a media item, wherein the listening history includes retention information indicating, for each respective portion of a plurality of portions of the media item, a number of listeners who listened to the respective portion of the media item;
using the retention information, generating a retention graph representing the number of listeners who listened to corresponding portions of the media item as a function of time;
detecting one or more extrema in the retention graph, wherein each extremum of the one or more extrema in the retention graph corresponds to a reduction in the number of listeners who listened to the corresponding portions of the media item;
determining that a first extremum of the one or more extrema meets predefined sub-content criteria; and
in accordance with the determination that the first extremum meets the predefined sub-content criteria, storing an indication that the portions of the media item corresponding to the first extremum comprise first sub-content, different from primary content, embedded in the media item.

\* \* \* \* \*